(12) United States Patent
Petterson et al.

(10) Patent No.: US 7,868,586 B2
(45) Date of Patent: Jan. 11, 2011

(54) SYSTEM, DEVICES, AND METHOD FOR SELECTIVELY WIRELESSLY ENERGIZING PASSIVE WIRELESS DATA COMMUNICATIONS DEVICES

(75) Inventors: Mike Petterson, Marysville, WA (US); Andy Reynolds, Bothell, WA (US)

(73) Assignee: Intermec IP Corp., Everett, WA (US)

( * ) Notice: Subject to any disclaimer, the term of this patent is extended or adjusted under 35 U.S.C. 154(b) by 606 days.

(21) Appl. No.: 11/932,281

(22) Filed: Oct. 31, 2007

(65) Prior Publication Data

US 2009/0108997 A1      Apr. 30, 2009

(51) Int. Cl.
  *H01M 10/44*   (2006.01)
  *H01M 10/46*   (2006.01)
(52) U.S. Cl. .................................... 320/108
(58) Field of Classification Search .............. 320/107, 320/108, 128
  See application file for complete search history.

(56) References Cited

U.S. PATENT DOCUMENTS 6,127,799 A * 10/2000 Krishnan ................... 320/108
2007/0107766 A1 * 5/2007 Langley et al. .............. 320/101

OTHER PUBLICATIONS

Karalis, A., et al., "Wireless Non-Radiative Energy Transfer," Center for Materials Science and Engineering and Research Laboratory of Electronics, MIT, Cambridge, MA, AR XIV. Physics/0611063v2, Feb. 2007, pp. 1-17.

Karalis, A., et al., "Efficient Wireless Non-Radiative Mid-Range Energy Transfer," Center for Materials Science and Engineering and Research Laboratory of Electronics, MIT, Cambridge, MA, Annals of PHysics, DOI:10.1016/J.AOP.207.04.017, Apr. 2007, pp. 1-19.

* cited by examiner

*Primary Examiner*—Edward Tso
(74) *Attorney, Agent, or Firm*—Seedi IP Law Group PLLC

(57) ABSTRACT

Systems, methods, and devices wirelessly energize passive wireless data communication devices. In one embodiment, remotely powered wireless transmission power sources are actuated by a user. Upon actuation, a selected wireless transmission power source transmits electromagnetic energization energy into a volume of space, thereby energizing passive wireless data communication devices therein. The user may use a hand-held portable automatic data collection device to interrogate the wireless data communication devices and may use the automatic data collection device to remotely actuate the selected wireless transmission power source.

66 Claims, 8 Drawing Sheets

SYSTEM, DEVICES, AND METHOD FOR SELECTIVELY WIRELESSLY ENERGIZING PASSIVE WIRELESS DATA COMMUNICATIONS DEVICES

BACKGROUND

1. Technical Field

This disclosure relates generally to passive wireless data communication devices, and more particularly, to devices, system and methods for wirelessly providing electromagnetic energy for energizing passive wireless data communication devices.

2. Description of the Related Art

Conventional wireless data communication devices such as radio frequency identification (RFID) devices come in two general types, active and passive. Active wireless data communication devices have a consumable internal power storage device (e.g., battery), which is used to power the internal circuitry of the wireless data communication device for broadcasting a signal to an automatic data collection device. Passive wireless data communication devices, on the other hand, do not have a consumable internal power storage device. Such wireless data communication devices include an antenna that receives electromagnetic energy at a radio frequency. The antenna induces an electrical current that powers internal circuitry of the passive wireless data communication device and powers transmitting a signal to an automatic data collection device.

The global use of wireless data communication devices is increasing annually, as is, the number and types of applications in which they are used. Exemplary uses of wireless data communication devices include smart passports, smart identification cards, product tracking, animal identification, and inventory systems, to name a few.

In many situations, such as product tracking, it is desirable to read/interrogate a wireless data communication device by bringing an automatic data collection device to the wireless data communication device instead of the other way around. For example, when tracking products in a warehouse environment, it is generally easier to read/interrogate a pallet loaded with products in place with a portable automatic data collection device than it is to move the pallet of products to a stationary automatic data collection device. In addition to ease of use, it may be economically desirable to use portable automatic data collection devices instead of stationary automatic data collection devices because, for example, it may be faster for a person to move down an aisle reading from good-after-good than is to bring all of the individual goods to a stationary automatic data collection device.

Some conventional portable automatic data collection devices are shaped, sized, and configured to be hand-held by a user. Such automatic data collection devices may be used by couriers and personnel in a warehouse to name a few. These portable automatic data collection devices are typically battery powered. The battery provides the energy necessary for the hand-held automatic data collection device to read/interrogate passive wireless data communication devices and to energize passive wireless data communication devices.

A problem with conventional portable hand-held automatic data collection devices is that current batteries are generally insufficient to power a portable hand-held automatic data collection device for an extended period of time when the automatic data collection device is heavily used. It is generally not practical to increase the duty time, i.e., the amount of time over which a portable hand-held data collection device may be used, of a hand-held portable automatic data collection device by merely increasing the battery size. The size and weight of a portable hand-held automatic data collection device is generally limited by the desire that the portable hand-held automatic data collection device be small and light such that the portable hand-held automatic data collection device does not become too burdensome on the user of the portable hand-held automatic data collection device.

In some situations, such as at a checkout register, it may be practical to have a hand-held automatic data collection device that is connected by wires to a power source such as an electrical grid. However, the length of the wires limit the range of motion of the hand-held automatic data collection device thereby making such a hand-held automatic data collection device impractical for many situations such as in a large warehouse where the user may need to roam over large distances or for use by a delivery man.

Thus, there exists a need for a method and system that allows a hand-held automatic data collection device to be truly portable, wherein a truly portable hand-held automatic data collection device does not have a limited range of motion. There also exists a need to extend the duty time for a portable hand-held automatic data collection device. Furthermore, the need to address the aforementioned deficiencies of current portable hand-held automatic data collection devices, and other deficiencies, will only be exacerbated by the annual increase of the number of wireless data communication devices being used.

BRIEF SUMMARY

In one aspect, a method of wirelessly providing power to remote wireless data communication devices includes: receiving, at a first wireless transmission power source of a plurality of wireless transmission power sources, an actuation-prompt; determining whether to wirelessly transmit electromagnetic energization energy from the first wireless transmission power source in response to receiving the actuation-prompt; and wirelessly transmitting electromagnetic energization energy from the first wireless transmission power source of the plurality of wireless transmission power sources for energizing at least one wireless data communication device during a first energization cycle of the first wireless transmission power source.

In another aspect, a portable hand-held automatic data collection device that has a housing that is shaped and sized for being portable and hand-held by a user. The portable hand-held automatic data collection device includes an actuation subsystem, disposed within the housing, configured to wirelessly provide an actuation-prompt to a remote first wireless transmission power source of a plurality of remote wireless transmission power sources to cause the first wireless transmission power source to wirelessly transmit the electromagnetic energization energy for energizing remote wireless data communication devices; and a data collection subsystem, disposed within the housing, configured to wirelessly interrogate one or more remote wireless data communication devices energized by the remote first wireless transmission power source.

In another aspect, a wireless transmission power source includes an actuation subsystem configured to receive an actuation-prompt to cause the wireless transmission power source to wirelessly transmit electromagnetic energization energy for energizing remote wireless data communication devices; a wire energy transmitter subsystem configured to wirelessly transmit electromagnetic energization energy directed at a coverage volume of space; and a conflict control subsystem configured to selectively permit the wire energy transmitter subsystem to wirelessly transmit electromagnetic energization energy.

In another aspect, a system for interrogating passive wireless data communication devices includes a plurality of wireless transmission power sources, each one of the wireless transmission power sources having a respective housing and each one of the wireless transmission power sources coupled to a remote power source and configured to wirelessly transmit electromagnetic energization energy into respective coverage volumes of space for energizing passive wireless data communication devices therein, wherein the respective coverage volume of space of at least one of the wireless transmission power sources overlaps the respective coverage volume of space of at least another one of the wireless transmission power sources. The system further includes a hand-held portable automatic data collection device configured to interrogate energized wireless data communication devices.

In another aspect, a system for energizing passive wireless data communication devices includes a plurality of wireless transmission power sources. Each one of the wireless transmission power sources includes: a power subsystem coupled to a remote power source and configured to provide electrical power to the respective wireless transmission power source; a wireless energy transmitter subsystem configured to wirelessly transmit electromagnetic energization energy into a coverage volume of space of the respective wireless transmission power source for energizing passive wireless data communication devices therein, wherein the respective coverage volume of space of at least one of the wireless transmission power sources overlaps the respective coverage volume of space of at least another one of the wireless transmission power sources; a communication subsystem configured to send messages to and receive messages from at least one other wireless transmission power sources; and a conflict control subsystem configured to configured to selectively permit the wireless energy transmitter subsystem to transmit electromagnetic energization energy into the respective coverage volume of space based at least upon one or more messages from at least one other wireless transmission power source.

In yet another aspect, a system for energizing passive wireless data communication devices includes a plurality of wireless transmission power sources and a remote transmission conflict controller in communication with each wireless transmission power source. Each one of the wireless transmission power sources includes: a power subsystem coupled to a remote power source and configured to provide electrical power to the respective wireless transmission power source; a wireless energy transmitter subsystem configured to wirelessly transmit electromagnetic energization energy into a coverage volume of space of the respective wireless transmission power source for energizing passive wireless data communication devices therein, wherein the respective coverage volume of space of at least one of the wireless transmission power sources overlaps the respective coverage volume of space of at least another one of the wireless transmission power sources; a communication subsystem configured to send messages and receive messages; and a conflict control subsystem configured to configured to selectively permit the wireless energy transmitter subsystem to transmit electromagnetic energization energy into the respective coverage volume of space based at least upon one or more messages. The remote transmission conflict controller is configured to determine for each wireless transmission power source whether the respective wireless transmission power source can transmit electromagnetic energization energy into the respective coverage volume.

DETAILED DESCRIPTION

In the following description, certain specific details are set forth in order to provide a thorough understanding of various embodiments. However, one skilled in the art will understand that the invention may be practiced without these details. In other instances, well-known structures and components associated with wireless data communication devices, automatic data collection devices, and computer systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
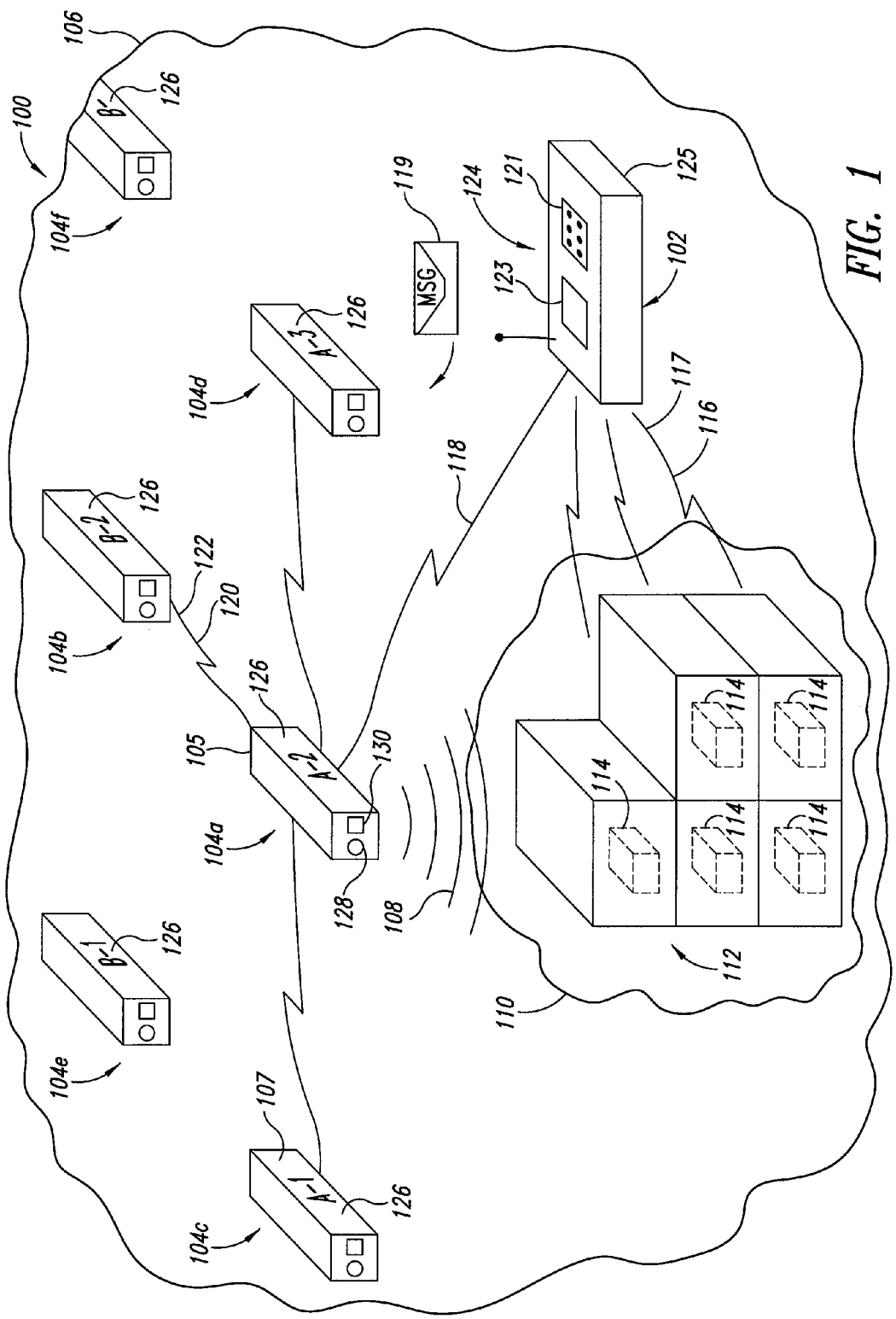
FIG. 1 is an isometric view of selected components of an automatic data collection system, according to one non-limiting illustrated embodiment.

FIG. 1 shows selected components of an automatic data collection system 100 having an automatic data collection (ADC) device 102 and a plurality of wireless transmission power sources (WTPSs), individually referenced as 104a-104f and collectively referenced as 104. The WTPSs 104 are located within a volume of space 106 of an environment such as a warehouse, store, manufacturing site, storage site, etc. Each WTPS 104 may be coupled to a supporting structure (not shown) such as walls, shelves, racks, ceiling, etc. and may be coupled to a power supply such as an electrical grid and/or a generator, etc. Alternatively, each WTPS 104 may be electromagnetically coupled, e.g., without wires, to a power supply. (See "Efficient Wireless Non-Radiative Mid-Range Energy Transfer," Ar XIV. Physics/0611063v2, Aristeidis Karalis; J. D. Joannopoulos, Marin Soljacic (February 2007); "Efficient Wireless Non-Radiative Mid-Range Energy Transfer," Annals of Physics, DOI: 10.1016/J.AOP.207.04.017, Aristeidis Karalis; J. D. Joannopoulos, Marin Soljacic (April 2007), which are hereby incorporated by reference in their entirety.

Each WTPS 104 may be configured to emit electromagnetic energization energy 108 toward a respective coverage volume of space 110 and configured to be remotely actuated by the ADC device 102. In FIG. 1, for the sake of clarity, the respective coverage volumes for WTPSs 104b through 104f are not shown.

Frequently, the WTPSs 104 may be distributed in close proximity to each other, such that one or more of the coverage volumes of space 110 overlap, so that the entire, or a substantial portion, of the volume of space 106 can receive electromagnetic energization energy 108 from at least one of the WTPSs 104.

The WTPSs 104 may be configured to communicate with each other. For example, in the embodiment illustrated in FIG. 1, the WTPS 104a is configured to wirelessly communicate with at least its respective nearest neighbors, WTPSs 104b, 104c and 104e.

FIG. 1 also shows objects 112 and wireless data communication (WDC) devices 114 within the coverage volume 110. Each one of the WDC devices 114 includes a memory that has information stored therein. The information stored in the memory of a respective one of the WDC devices 114 may be related to a respective one of the objects 112. The WDC devices 114 are configured to be powered by the electromagnetic energization energy 108 and configured for wireless communication. As a nonlimiting example, the WDC devices 114 may be passively powered radio frequency identification (RFID) devices.

In the embodiment illustrated in FIG. 1, after the WDC devices 114 are powered by the electromagnetic energization energy 108, the WDC devices 114 communicate data 116, which is carried in a signal 117, to the ADC device 102. The data 116 from a respective one of the WDC devices 114 is generally related to the information stored in the respective WDC device 114. When multiple WDC devices 114 are simultaneously activated, there may be collisions between signals 117 from different WDC devices 114. Thus, the WDC devices 114 may be configured to employ collision avoidance and/or collision resolution techniques to provide their respective data 116 despite collisions of signals 117. Generally, each one of the WDC devices 114 continues, perhaps intermittently, to provide its data 116, until its data 116 has been received by the ADC device 102.

In some embodiments, the electromagnetic energization energy 108 is transmitted in a given frequency band and the signals 117 are transmitted at approximately the same frequency band. In other embodiments, the electromagnetic energization energy 108 is transmitted in a first frequency band and the signals 117 are transmitted in a second frequency band which does not overlap the first frequency band. Such may advantageously increase a signal-to-noise ratio of the communications.

In operation, when a user (not shown) wants to interrogate the WDC devices 114, the user may determine which one of the WTPSs 104 is closest to the objects 112, which in FIG. 1 is the WTPS 104a. The user may use the ADC device 102 to provide an actuation-prompt 118 to WTPS 104a. Upon receiving the actuation-prompt 118, WTPS 104a may send a quiet-prompt 120 to at least the nearest WTPSs 104b, 104c and 104e; and the nearest WTPSs 104b, 104c and 104e may send an acknowledgement 122.

Typically, a given one of the WTPSs 104 begins an energization sequence when the respective WTPS 104 receives an actuation-prompt 118. Once actuated, the respective WTPS 104 may perform a variety of actions that make up an energization sequence. For example, the respective WTPS 104 may perform actions such as, but not limited to, sending a quiet-prompt 120, receiving acknowledgments 122, determining when to transmit the electromagnetic energization energy 108, transmitting the electromagnetic energization energy 108, and various administrative actions such as, but not limited to, sending end-of-transmission messages, and/or acknowledgments 122 for quiet-prompts 120 received during the current energization sequence, etc. Typically, the last performed action may denote the end of the current energization sequence. However, the end of the current energization sequence may be regarded as when the respective WTPS 104 ends the transmission of the electromagnetic energization energy 108, even if various administrative actions have not yet been completed.

The ADC device 102 includes a housing 125 that may be shaped and sized to be portable, and hand-held, by a user. The ADC device 102 may include a user interface 124 which may allow the user to input information, and in some embodiments, display information. As nonlimiting examples, the user interface may include a keypad 121, a display device 123 such as a liquid crystal display, a touch screen, user selectable icons, voice recognition, etc.

In the embodiment illustrated in FIG. 1, each one of the WTPSs 104 includes respective power-source identifiers 126. The power-source identifiers 126 may be human readable, and in that case, a user may select a particular one of the WTPSs 104 by entering the power-source identifier 126 for the particular one of the WTPSs 104 into the ADC device 102.

In some embodiments, the ADC device 102 and the WTPSs 104 may be configured for wireless communication. For example, the ADC device 102 and the WTPSs 104 may communicate via radio technologies such as BLUETOOTH® wireless protocol, WI-FI® wireless protocol, or optical technologies such as infrared signals, etc. The actuation-prompt 118 may be included in the message 119 that is wirelessly transmitted to the selected WTPS 104a, and the message 119 may include identification information related to the power-source identifier 126.

In some embodiments, the power-source identifier 126 may be machine-readable. In that case, the ADC device 102 may include a reader such as a scanner or imager, or the like, that reads the power-source identifier 126. The ADC device 102 may then include identification information related to the power-source identifier 126 in the message 119 that carries the actuation-prompt 118.

In some embodiments, the WTPSs 104 may include a WDC device component, which may be an active component, such as an active RFID device and the WDC device component has the power-source identifier 126 stored therein. The user may acquire the power-source identifier 126 by using the ADC device 102 to interrogate the particular WTPS 104. The message 119 may then include information indicative of the power-source identifier 126.

In yet another embodiment, the WTPSs 104 may include an actuation sensor 128, which senses the actuation-prompt 118 thereby causing the respective WTPS 104 to initiate an energization sequence. As a nonlimiting example, the ADC device 102 may include a light source (not shown) and the actuation sensor 128 may include a light sensor. In that case, a user may actuate the WTPS 104a by illuminating the light sensor of WTPS 104a with light, which acts as the actuation-prompt 118, from the light source. The light source and the light sensor are configured to operate in overlapping portions of the light spectrum, which ranges between extreme ultraviolet (approximately 3 Picohertz) to far infrared (approximately 3 Terahertz).

As another nonlimiting example, the actuation sensor 128 may include a radio frequency (RF) receiver and the actuation-prompt 118 may be an electromagnetic signal from the ADC device 102. The electromagnetic signal may be at the same frequency band at which the ADC device 102 and the WDC devices 114 communicate and/or may be at the same frequency band as the electromagnetic energization energy 108. It should be remembered that the WTPSs 104 are coupled to a power supply, and consequently, the WTPSs 104 do not need to be powered/energized by electromagnetic energization energy from the ADC device 102. Thus, even if the actuation-prompt 118 is at the same frequency as the electromagnetic energization energy 108, the actuation-prompt 118 may be a lower power signal, e.g., less power than the power in the electromagnetic energization energy 108, because communication alone requires less energy than does communication and energizing passive WDC devices 114. Thus, the ADC device 102 may conserve energy by providing the selected WTPS 104 with a low power signal, i.e., a low power actuation-prompt 118.

In yet another embodiment, the WTPSs 104 may include an actuator 130 such as a switch, button, lever, knob, etc. A user may initiate an energization sequence by physical manipulation of the actuator 130. In that case, the ADC device 102 may not need to provide the actuation-prompt 118. For example, in some embodiments, the automatic data collection system 100 may be employed in a retail store environment, and the WTPSs 104 may be disposed where they may be readily accessible to store personnel such as on an underside of a shelf that is directly above objects 112. The store personnel may use the actuator 130 to actuate the WTPS 104a.

Figure 2:
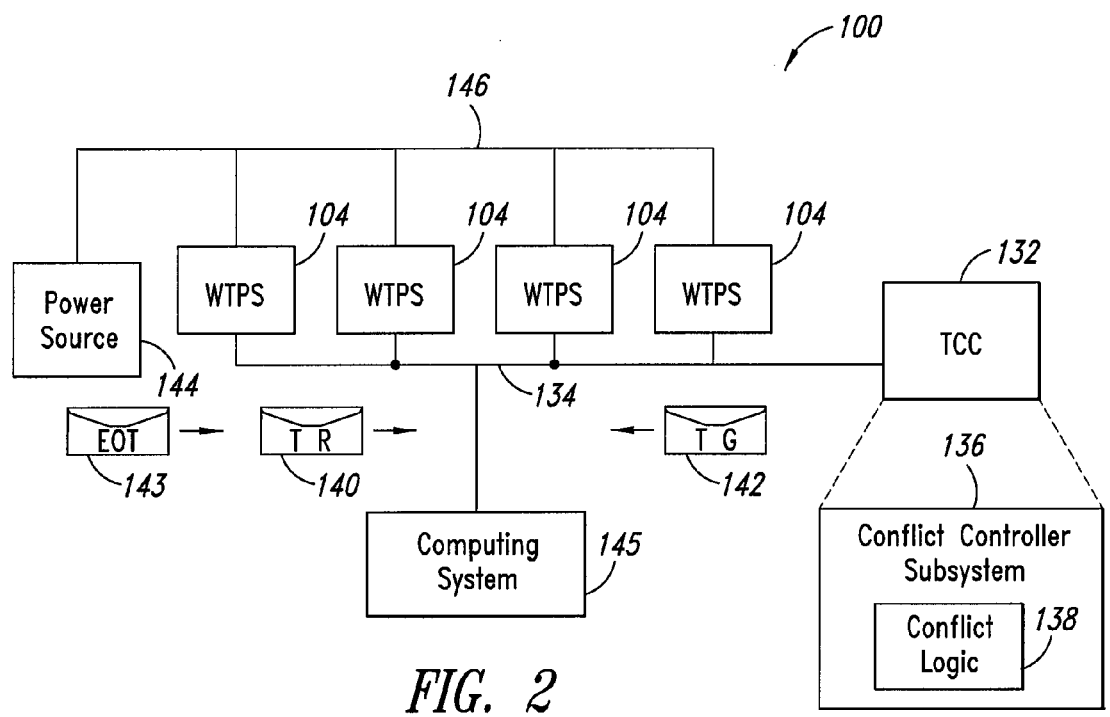
FIG. 2 is a schematic diagram of selected components of the automatic data collection system, according to one non-limiting illustrated embodiment.

FIG. 2 shows selected components of an alternative embodiment of the ADCS 100. This alternative embodiment, and those alternative embodiments and other alternatives described herein, may be substantially similar to previously described embodiments, and common acts and structures are identified by the same reference numbers. Only significant differences in operation and structure are described below.

The WTPSs 104 are coupled to a transmission conflict controller (TCC) 132 via a communication carrier 134. The communication carrier 134 may be a wire, coaxial cable, fiber optic, or other tangible medium. Alternatively, the communication carrier 134 may be a wireless carrier. The TCC 132 may include a conflict controller subsystem 136 having conflict logic 138. The conflict controller subsystem 136 is configured to manage the WTPSs 104 so as to reduce transmission conflicts.

When one of the WTPSs 104 is selected by a user, the selected WTPS 104 sends a transmission request message 140 to the TCC 132. The conflict controller subsystem 136 determines whether to allow the selected WTPS 104 to transmit electromagnetic energization energy 108 based at least upon the current status of at least one of the other WTPSs 104. For example, if the electromagnetic energization energy 108 from the selected WTPS 104 might enter the coverage volume of space 110 of another one of the WTPSs 104 and the other WTPS 104 is currently in an energization sequence, then the conflict controller subsystem 136 might wait a period of time before granting the selected WTPS 104 with permission to transmit electromagnetic energization energy 108. When the conflict controller subsystem 136 determines that the selected WTPS 104 may transmit electromagnetic energization energy 108 without conflicting with another one of the WTPSs 104, the TCC 132 sends a transmission granted message 142 to the selected WTPS 104. After all of the WDC devices 114 within the coverage volume of space 110 of the selected WTPS 104 have been interrogated, the selected WTPS 104 may send an end-of-transmission message 143 to the TCC 132 so that the conflict controller subsystem 136 will know the current status of the selected WTPS 104. The controller subsystem 136 and/or conflict logic 138 may be implemented in firmware that is stored in a memory and that is executed by a suitable instruction execution system. If implemented in hardware, as in an alternative embodiment, the conflict controller subsystem 136 and/or conflict logic 138 can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In the embodiment shown in FIG. 2, the WTPSs 104 are electrically coupled to and powered by a power source 144 via an electrical conductor 146 such as conductive wiring. In some embodiments, the WTPSs 104 may be wirelessly coupled to the power source 144.

The automatic data collection system 100 may also include a computing system 145, which is coupled to the communication carrier 134. The computing system 145 may perform various functions such as controlling inventory, monitoring inventory, ordering inventory and accounting. In some embodiments, the WTPSs 104 may be configured to interrogate WDC devices 114. In such embodiments, the WTPSs 104 may provide the computing system 145 with some, or all, of the data 116 from interrogated WDC devices 114 and/or information related to data 116, via communication carrier 134.

Figure 3:
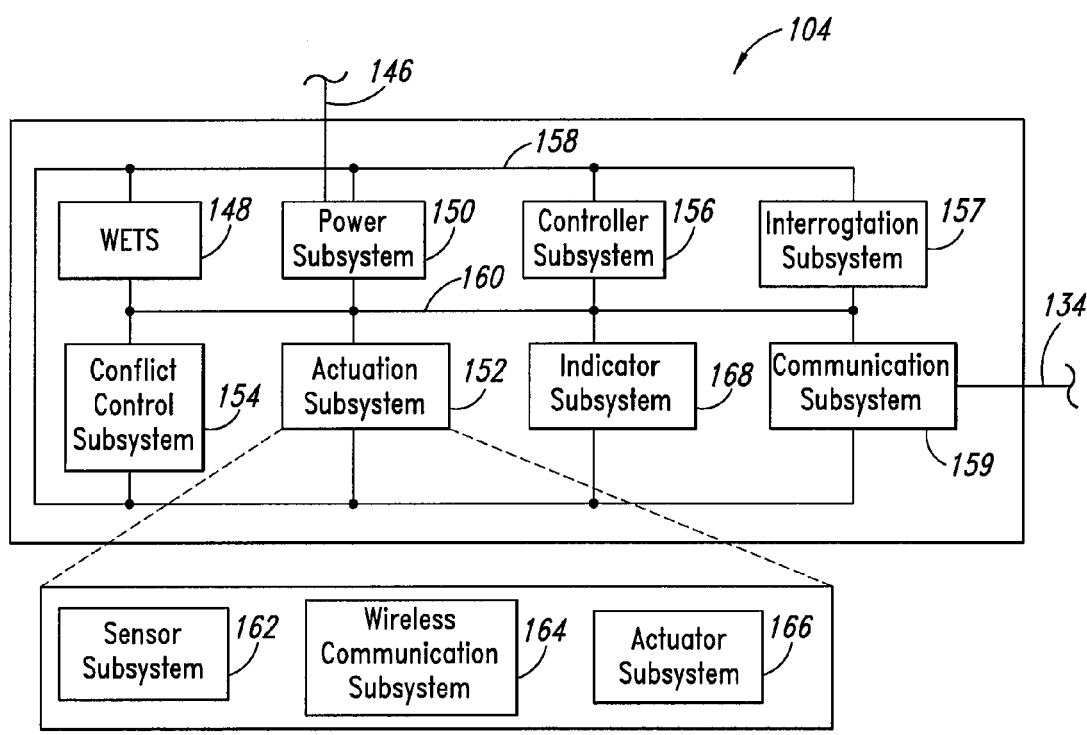
FIG. 3 is a schematic diagram of a wireless transmission power source, according to one non-limiting illustrated embodiment.

FIG. 3 shows selected components of a WTPS 104, according to one illustrated embodiment. The WTPS 104 includes a wireless energy transmitter subsystem 148, a power subsystem 150, an actuation subsystem 152, a conflict control subsystem 154, a controller subsystem 156, an interrogation subsystem 157, a communication subsystem 159, and an indicator subsystem 168, all of which are coupled by one or more buses 160. In the embodiment illustrated, the power subsystem 150 is electrically coupled to the electrical conductor 146 and receives electrical power from the power source 144. As previously described, the WTPS 104 may be powered wirelessly, and in that case, the power subsystem 150 receives wireless electromagnetic energy. The power subsystem 150 transforms, as necessary, the electrical power to appropriate voltages and currents for the components of the WTPS 104 and provides electrical power to the components of the WTPS 104 via electrical conductors 158.

The actuation subsystem 152 may include one or more of a sensor subsystem 162, a wireless communication subsystem 164 and an actuator subsystem 166. Upon actuation, the actuation subsystem 152 may provide the conflict control subsystem 154 and/or the controller subsystem 156 with an actuation-trigger signal. The sensor subsystem 162 is configured to detect the actuation-prompt 118 in the form of a signal. As nonlimiting examples, the sensor subsystem 162 may include a light sensor and/or an RF sensor. In some embodiments, other subsystems such as the interrogation subsystem 157 and/or the wireless energy transmission subsystem 148 may include various radio components, such as radio or microwave frequency (hereinafter RF) antennas, RF transmitters, RF receivers, RF transceivers which may be used as the RF sensor. In yet another embodiment, the sensor subsystem 162 may include a motion detector configured to detect motion in at least a portion of the coverage volume 110 and/or in a predetermined volume of space which may be proximal to the coverage volume of space. The actuator subsystem 166 may include a switch, knob, button, etc. that a user may physically manipulate to actuate the WTPS 104.

In some embodiments, the actuation subsystem 152 may include an active wireless data communication device having a memory with the power-source identifier 126 of the respective wireless transmission power source 104 stored therein. The active wireless data communication device may be interrogated by the ADC device 102 and provide the ADC device 102 with an indicator of the power-source identifier 126. In some embodiments, the power-source identifier 126 may be carried on the housing 105 and may be machine-readable symbols and/or human-readable.

The wireless communication subsystem 164 may be configured to receive the actuation-prompt 118 in the form of the message 119. Typically, the message 119 is in accordance with a communication protocol such as, but not limited to, BLUETOOTH® wireless protocol and/or WI-FI® wireless protocol. The wireless communication subsystem 164 may include an RF receiver, an RF transmitter, and/or an RF transceiver.

In some embodiments, the wireless energy transmission subsystem 148 may include an RF receiver, an RF transmitter, and/or an RF transceiver and may be configured to detect and/or emit electromagnetic energization energy 108. Detected electromagnetic energization energy 108 may, in some embodiments, be used as an actuation-prompt. Alternatively, in some embodiments, detected electromagnetic energization energy 108 may be used by the conflict control subsystem 154 to determine whether to permit the wireless energy transmission subsystem 148 to wirelessly transmit electromagnetic energization energy 108.

The interrogation subsystem 157 may include an RF receiver, an RF transmitter, and/or an RF transceiver and may be configured to interrogate the WDC devices 114. In some embodiments, the interrogation subsystem 157 and the wireless energy transmission subsystem 148 may be embodied in an RF reader used for reading RFID devices.

It should be emphasized that in some embodiments, the wireless communication subsystem 164 will operate at a different frequency band than either the wireless energy transmission subsystem 148 or the interrogation subsystem 157. Consequently, in some embodiments, the wireless communication subsystem 164 will have RF components such as an RF receiver, an RF transmitter, and/or an RF transceiver that are different and distinct from RF receivers, RF transmitters, and/or RF transceivers used by either the wireless energy transmissions subsystem 148 or the interrogation subsystem 157. However, in some embodiments, the wireless energy transmission subsystem 148 and the interrogation subsystem 157 may share RF components such RF receivers, RF transmitters, and/or RF transceivers. For example, in some embodiments, the wireless communication subsystem 164 may be embodied in a BLUETOOTH® protocol compliant communications device and/or a WIFI® protocol compliant communications device and the wireless energy transmission subsystem 148 and the interrogation subsystem 157 may be embodied in an RF reader for reading RFID devices. It should also be noted that while designated herein as RF, such designation is not limited to the radio portion of the electromagnetic spectrum, but may include other portions, for instance the microwave portion.

In one embodiment, the conflict control subsystem 154 may be configured to provide the transmission conflict controller 132 with the transmission request message 140 and to receive the transmission granted message 142. In addition, the conflict control subsystem 154 may also provide the transmission conflict controller 132 with an end-of-transmission message 143.

In another embodiment, the conflict control subsystem 154 may be configured to provide the quiet-prompt 120 to other WTPSs 104 and may be configured to respond to a quiet-prompt 120 from another WTPS 104 by providing the acknowledgment 122. The conflict control subsystem 154 may also provide end-of-transmission messages 143 to other WTPSs 104.

In some embodiments, if a first selected WTPS 104 has been actuated, i.e., begun an energization sequence, prior to receiving a quiet-prompt 120 from a second selected WTPS 104, the conflict control subsystem 154 of the first selected WTPS 104 may wait until the current energization sequence has been completed before providing the acknowledgement 122. In other words, the first selected WTPS 104 may ignore the quiet-prompt 120 from the second selected WTPS 104 during the energization sequence of the first selected WTPS 104.

Among other things, the conflict control subsystem 154 may provide an emit-trigger signal to the wireless energy transmission subsystem 148 and/or the controller subsystem 156. The conflict control subsystem 154 may send the emit-trigger signal when the conflict control subsystem 154 determines that the wireless energy transmission subsystem 148 may operate. In some embodiments, the determination may be based upon receiving the transmission granted message 142 from the transmission conflict controller 132.

In some embodiments, the conflict control subsystem 154 may have knowledge of a number of other WTPSs 104, and the conflict control subsystem 154 may send the emit-trigger signal when it receives an acknowledgement 122 for a quiet-prompt 120 from one or more of the other known WTPSs 104.

In other embodiments, the conflict control subsystem 154 may have knowledge of the current status of other WTPSs 104 through, for example, various messages such as quiet-prompts 120 and/or end-of-transmission messages 143. Based upon received quiet-prompts 120 and/or end-of-transmission messages 143, the conflict control subsystem 154 may update a status table, or other structured data, which may be stored in a memory or cached in a buffer, for other WTPSs 104. The conflict control subsystem 154 may determine whether or not to provide the emit-trigger signal in part based upon the current status of one or more of the other WTPSs 104 as determined by the status table.

In some embodiments, the conflict control subsystem 154 may attempt to detect electromagnetic energization energy 108 from another WTPS 104, and if no energy is detected, then the conflict control subsystem 154 may send the emit-trigger signal to the wireless energy transmission subsystem 148 and/or the controller subsystem 156. On the other hand, if the conflict control subsystem 154 does detect electromagnetic energization energy 108 from another WTPS 104, the conflict control subsystem 154 may wait for a period of time and/or until the conflict control subsystem 154 no longer detects electromagnetic energization energy 108 from another WTPS 104 before sending the emit-trigger signal to the wireless energy transmission subsystem 148 and/or the controller subsystem 156.

In some embodiments, the conflict control subsystem 154 may send the emit-trigger signal, and then if a conflict is detected, the conflict control subsystem 154 may wait a random period of time before sending another emit-trigger signal to the controller subsystem 156.

The wireless energy transmission subsystem 148 receives power from the power subsystem 150 and includes various components such as an RF antenna and circuitry for wirelessly transmitting electromagnetic energization energy 108 toward the coverage volume of space 110. The wireless energy transmission subsystem 148 may emit the electromagnetic energization energy 108 in response to the emit-trigger signal from the conflict control subsystem 154 and/or a signal from the controller subsystem 156. Typically, the wireless energy transmission subsystem 148 will continue to emit the electromagnetic energization energy 108 until signaled to end emitting the electromagnetic energization energy 108. Alternatively, in some embodiments, the wireless energy transmission subsystem 148 may emit the electromagnetic energization energy 108 for a period of time and then end emitting the electromagnetic energization energy 108 at the end of that period of time.

In yet another embodiment, the interrogation subsystem 157 may be configured to detect the signals 117 carrying data 116. When the interrogation subsystem 167 no longer detects signals 117, the interrogation subsystem 167 may use the lack of the signals 117 as an end-trigger for ending the transmission of the electromagnetic energization energy 108. The wireless energy transmission subsystem 148 may continue to emit the electromagnetic energization energy 108 for a fixed period of time after the interrogation subsystem 167 fails to detect signals 117 so as to ensure that all of the WDC devices 114 in the coverage volume of space 110 have successfully transmitted their respective data 116.

In yet another embodiment, a user may provide an end-prompt and may provide the end-prompt in the same manner in which the actuation-prompt 118 was provided. The actuation subsystem 152 receives the end-prompt and signals the wireless energy transmission subsystem 148 and/or the controller subsystem 156, which in turn signals the wireless energy transmission subsystem 148 to end emitting the electromagnetic energization energy 108.

The indicator subsystem 168 may include multiple light sources, or the like, which emit light that is visible to a user of the ADC device 102 to provide status information. For example, a first color of light might indicate that the WTPS 104 is in sleep mode (awaiting an actuation-prompt 118), a second color of light might indicate the WTPS 104 is in standby mode (awaiting permission to transmit electromagnetic energization energy 108), and a third color of light might indicate active transmission of the electromagnetic energization energy 108. The indicator subsystem 168 activates one or more of the light sources based upon signals from the controller subsystem 156.

Among other things, the controller subsystem 156 manages the operations of the various subsystems of the wireless transmission power source 104 and may respond to received signals by providing at least one signal to one or more other components/subsystems. In some embodiments, the controller subsystem 156, portions thereof and/or functions performed thereby, may in some aspects be considered a portion of one or more of other wireless transmission power source subsystems such as wireless energy transmission subsystem 148, conflict control subsystem 154, actuation subsystem 152, indicator subsystem 168 and communication subsystem 159, and/or vice versa.

In some embodiments, the controller subsystem 156 may receive messages and/or signals and generate responses to the messages and/or signals. For example, in response to the WTPS 104 receiving an actuation-prompt 118, the controller subsystem 156 may generate a quiet-prompt 120 and/or a transmission request message 140. The controller subsystem 156 may also receive transmission granted messages 142, acknowledgments 122 from other WTPSs 104, and end-of-transmission messages 143 and may generate acknowledgments 122, and/or end-of-transmission messages 143. In some embodiments, the controller subsystem 156 may determine when to emit the electromagnetic energization energy 108, and may determine when to end the transmission of the electromagnetic energization energy 108.

While the controller subsystem 156 is illustrated as a single box, the controller subsystem 156 may take the form of one or more processors, such as microprocessors, digital signal processors, discrete logic circuit(s) having logic gates for implementing logic functions upon data signals, application specific integrated circuit(s) (ASIC(s)) having appropriate combinational logic gates, programmable gate array(s) (PGA(s)), field programmable gate array(s) (FPGA(s)), etc.

In some embodiments, the WTPS 104 may include the interrogation subsystem 167. The interrogation subsystem 167 may communicate with and interrogate the WDC devices 114, thereby receiving the data 116 from the interrogated WDC devices 114. The interrogation subsystem 167 may provide the received data 116 to the controller subsystem 156 and/or to the communication subsystem 159 and/or the wireless communication subsystem 164. In some embodiments, the controller subsystem 156 may process the data 116, and then provide the processed data to the communication subsystem 159 and/or the wireless communication subsystem 164. The communication subsystem 159, which may include a network interface card or the like, may provide the processed data, or raw data, to the computing system 145 and/or the TCC 132. The wireless communication subsystem 152 may provide the processed data, or raw data, to the ADC device 102.

Figure 4:
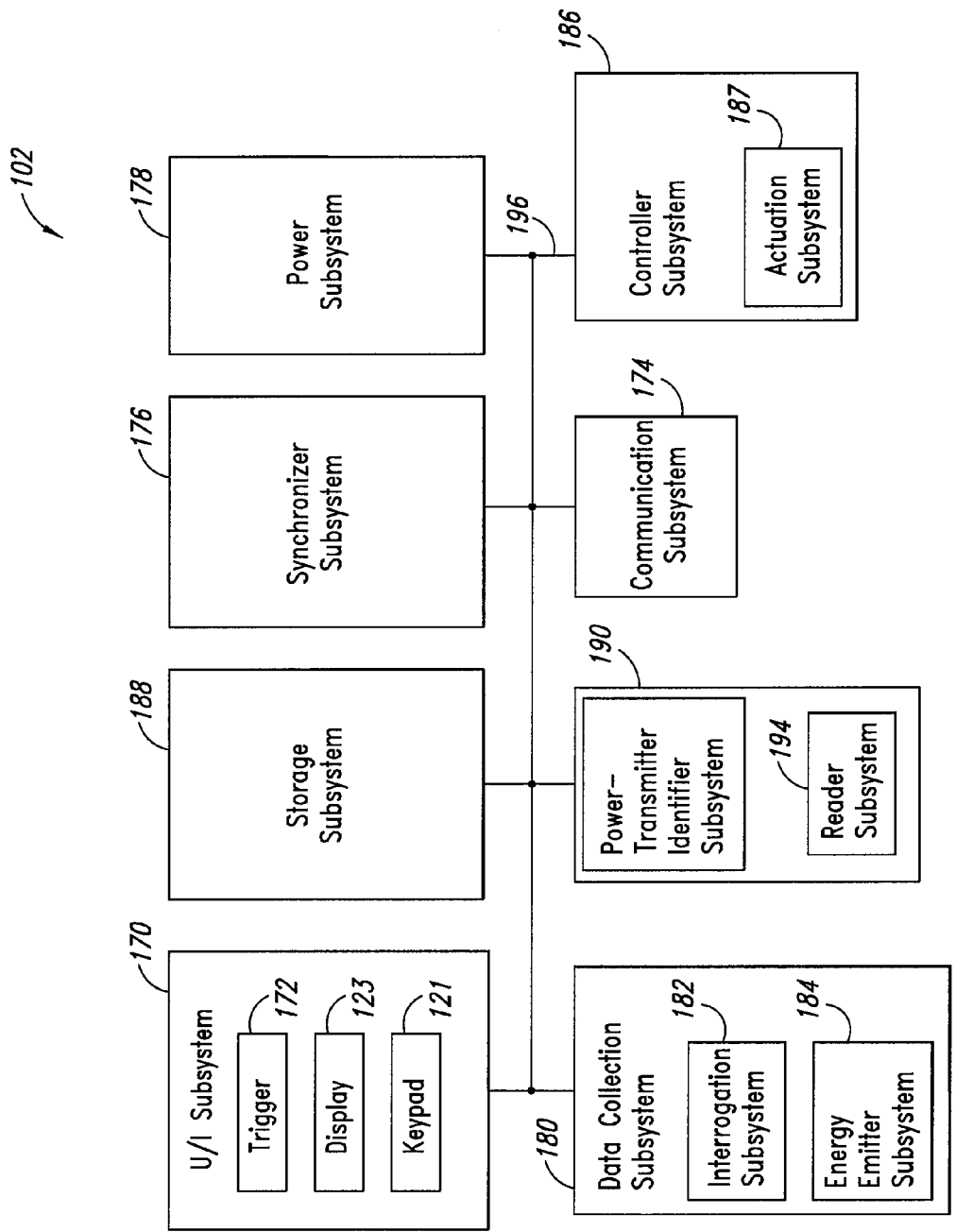
FIG. 4 is a schematic diagram of the automatic data collection (ADC) device, according to one non-limiting illustrated embodiment.

FIG. 4 shows selected components of the ADC device 102. The ADC device 102 includes a user interface subsystem 170, a communication subsystem 174, a synchronizer subsystem 176, a power subsystem 178, a data collection subsystem 180, a controller subsystem 186, a storage subsystem 188, and a power-transmitter identifier subsystem 190, all of which are communicatively coupled by one or more buses 196.

The user interface subsystem 170 includes a trigger mechanism 172 for actuating the ADC device 102, the display 123 that may provide a user with information, and the keypad 121 with which a user may input information. In some embodiments, the display 123 and/or the keypad 121 may be optional. In some embodiments, the display 123 may be a touch screen interface with which the user may enter and view information. The trigger device 172 may be used to actuate the ADC device 102 such that the ADC device 102 provides the actuation-prompt 118 and/or such that the ADC device 102 interrogates the WDC devices 114 and/or acquires power-source identifiers 126. The user interface subsystem 170 provides signals, such as a signal from the trigger 172, and information, such as user input, to the controller subsystem 186 and receives information from the controller subsystem 186, which may be provided to a user.

Among other things, the user interface 170 may be used to select a mode of operation of the ADC device 102. In some embodiments, modes of operation of the ADC device 102 may include one or more of: stand-alone mode; assisted energization mode; interrogation mode; and actuation mode.

In stand-alone mode, the ADC device 102 may operate to energize the WDC devices 114 and interrogate the WDC devices 114. Power consumption, for the ADC device 102, is highest in this mode of operation.

In assisted energization mode, the selected WTPS 104 provides a portion of the electromagnetic energization energy 108 necessary for energizing the WDC devices 114 and the ADC device 102 provides the remaining portion of the electromagnetic energization energy 108 necessary for energizing the WDC devices 114, and the ADC device 102 interrogates the WDC devices 114 and may be used to actuate the selected WTPS 104. Power consumption, for the ADC device 102, is the second highest in this mode of operation.

In interrogation mode, the ADC device 102 interrogates the WDC devices 114 and may be used to actuate the selected WTPS 104. The selected WTPS 104 provides the electromagnetic energization energy 108 necessary for energizing the WDC devices 114. Power consumption, for the ADC device 102, is the third highest in this mode of operation.

In actuation mode, the ADC device 102 actuates the selected WTPS 104. The selected WTPS 104 provides the electromagnetic energization energy 108 necessary for energizing the WDC devices 114 and interrogates the WDC devices 114. The selected WTPS 104 may provide some or all of the data 116, or related information, from the interrogated WDC devices 114 to the ADC device 102. Power consumption, for the ADC device 102, is the lowest in this mode of operation.

In addition, in some embodiments, the user interface subsystem 170 may be used for selecting a mode of operation for acquiring the power-source identifier 126 of one of the WTPSs 104, e.g., optical scanning or Radio Frequency interrogation.

In addition, in some embodiments, the user interface subsystem 170 may be used for selecting an actuation-prompt mode for providing the actuation-prompt 118. For example, actuation modes include message mode and signal mode. In message mode, various components of the hand-held ADC device 102 such as the communication subsystem 188 or the data collection subsystem 180 may provide the actuation-prompt 118. In signal mode, various components of the hand-held ADC device 102 such as the data collection subsystem 180 or the power-transmitter identifier subsystem 190 may provide the actuation-prompt 118. For example, the actuation-prompt 118 may be provided in the message 119 and/or in a signal such as a light beam and/or a wave in the radio frequency portion of the electromagnetic spectrum, which is approximately between 30 Hertz and 300 Gigahertz. In some embodiments, if electromagnetic energization energy 108 is selected to be used as the actuation-prompt 118, then electromagnetic energization energy 108 emitted for actuation purposes may be at a lower power level than electromagnetic energization energy 108 emitted for energization purposes so as to conserve energy at the ADC device 102.

The controller subsystem 186, among other things, manages the operations of the various subsystems of the ADC device 102 and may respond to received signals by providing at least one signal to one or more other components/subsystems. In some embodiments, the controller subsystem 186, portions thereof and/or functions performed thereby, may in some aspects be considered a portion of one or more of other ADC device subsystems such as user interface subsystem 170, synchronizer subsystem 176, data collection subsystem 180, power-transmitter identifier subsystem 190 and communication subsystem 188, and/or vice versa.

In some embodiments, the controller subsystem 186 may receive messages and/or signals and generates responses to the messages and/or signals. For example, in some embodiments, in response to a trigger signal from the user interface 170, the controller subsystem 156 may signal the power-transmitter identifier subsystem 190 to acquire the power-source identifier 126 for a selected WTPS 104. The controller subsystem 156 may process the power-source identifier 126 and include at least a portion of the acquired power-source identifier 126 and/or the processed power-source identifier 126 in an actuation-prompt 118 of a message 119, which is provided to the communication subsystem 174.

While the controller subsystem 186 is illustrated as a single box, the controller subsystem 186 may take the form of one or more processors, such as microprocessors, digital signal processors, discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

The power subsystem 178 may be or include a battery, super- or ultra-capacitor, fuel cell, or the like. The power subsystem 178 provides electrical power for the various components and subsystems of the ADC device 102 as needed.

The data collection subsystem 180 includes an interrogation subsystem 182 and may include an optional energy emitter subsystem 184. The interrogation subsystem 182 is configured to communicate with and/or interrogate the WDC devices 114, thereby acquiring data 116 from the interrogated WDC devices 114. The acquired data 116 may be provided to the controller subsystem 186. In some embodiments, the interrogation subsystem 182 communicates with, or starts to communicate with, a selected WTPS 104, which may use the communication, or the start of communication, as an actuation-prompt 118. In some embodiments, the interrogation subsystem 182 may interrogate a selected WTPS 104 to acquire the power-source identifier 126 of the selected WTPS 104. In some embodiments, communication such as a portion of handshaking between the ADC device 102 and the selected WTPS 104 may constitute an actuation-prompt 118 for the selected WTPS 104. In some embodiments, a portion of a communication for handshaking between the ADL device 102 and the selected WTPS 104 may constitute an actuation-prompt 118 for the selected WTPS 104.

The energy emitter subsystem 184 is configured to provide electromagnetic energization energy 108. Typically, the electromagnetic energization energy 108 is directed toward the WDC devices 114 so as energize the WDC devices 114. In some embodiments, electromagnetic energization energy 108 from the energy emitter subsystem 184 is directed toward a selected WTPS 104 and may be used as an actuation-prompt 118.

In stand-alone mode, the energy emitter subsystem 184 transmits electromagnetic energization energy 108 at a power level sufficient for energizing WDC devices 114. In assisted energization mode, the energy emitter subsystem 184 transmits electromagnetic energization energy 108 at a power level that is lower than the power level employed during stand-alone mode. Typically, the power level of electromagnetic energization energy 108 emitted by the energy emitter subsystem 184 when used for actuation purposes is the lowest power level.

Among other things, the wireless communication subsystem 164 may provide the actuation-prompt 118 carried in the message 119 to the selected WTPS 104. In some embodiments, the wireless communication subsystem 164 may be embodied in components employing communication protocols such as, but not limited to, BLUETOOTH® wireless protocol and/or WI-FI® wireless protocol. The wireless communication subsystem 164 may be used to communicate data 116, or information related to received data 116, to various devices such as computing system 145, servers, databases, etc.

The power-transmitter identifier subsystem 190 may include a reader subsystem 194. The reader subsystem 194 may be configured to read the power-source identifier 126. For example, the reader subsystem 194 may be an optical scanner or imager such as a bar code reader, and the power-source identifier 126 may be a bar code or other machine-readable indicia. The power-transmitter identifier subsystem 190 provides the acquired power-source identifier 126 to the controller subsystem, which then uses the acquired power-source identifier 126, or at least a portion thereof, or information related to the acquired power-source identifier 126 in an actuation-prompt 118 carried in a message 119.

In some embodiments, the power-source identifier 126 for the selected WTPS 104 may be acquired via radio frequency interrogation. In such embodiments, the power-transmitter identifier subsystem 190 may be configured to employ the interrogation subsystem 182, and if necessary, the energy emitter 184 to interrogate the selected WTPS 104. For example, as previously described, the WTPS 104 may include an RFID device, and the interrogation subsystem 182 may include an RFID reader that may wirelessly acquire the power-source identifier 126 from the RFID device of the selected WTPS 104.

The synchronization subsystem 176 is configured to detect the electromagnetic energization energy 108 emitted from a selected one of the WTPSs 104. When the ADC device 102 is operating in assisted energization mode, the synchronization subsystem 176 controls the emission of the energy emitter 184 such that the electromagnetic energization energy 108 from ADC device 102 is in phase with, or substantially in phase with, or generally in phase with, the electromagnetic energization energy 108 from the selected WTPS 104.

The ADC device 102 may include optional components such as a storage subsystem 188. Among other things, the storage subsystem 188 may have information related to or associated with data 116 stored therein. Among other things, the storage subsystem 188 may be embodied in a spinning media or disk-type storage device such as a hard drive or a memory-type storage device such as RAM, flash RAM.

Figure 5:
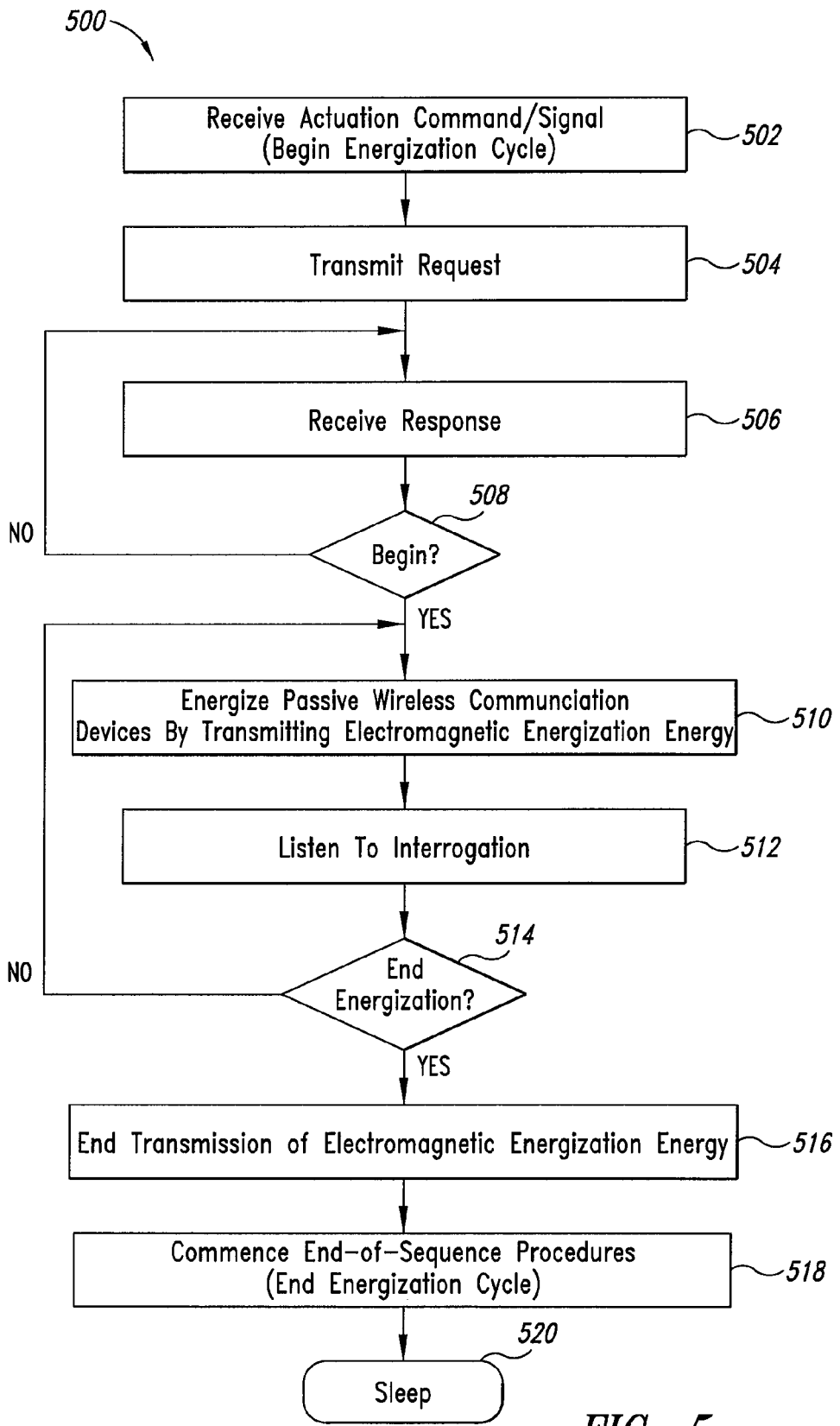
FIG. 5 is a flow diagram of an exemplary method implemented by a wireless transmission power source for energizing wireless data communication devices, according to one non-limiting illustrated embodiment.

FIG. 5 shows a flow diagram of an exemplary method 500 implemented by a wireless transmission power source 104 for energizing WDC devices 114. At block 502, a selected wireless transmission power source 104 receives an actuation command/signal. The actuation command/signal may be a signal, a message, or due to physical manipulation of an actuator at the selected wireless transmission power source 104.

At block 504, the selected wireless transmission power source 104 transmits a request for permission to transmit electromagnetic energization energy 108. In some embodiments, the request may be in the form of the transmission request 140 provided to the transmission conflict controller 132. In other embodiments, the request may be in the form of the quiet-prompt 120 provided to other WTPSs 104.

At block 506, the selected wireless transmission power source 104 receives at least one response to the request. In some embodiments, the response may be a transmission granted message 142 from the transmission conflict controller 132. In some embodiments, the response may be in the form of one or more acknowledgements 122 from other WTPSs 104.

At block 508, the selected wireless transmission power source 104 determines whether to begin transmitting electromagnetic energization energy 108. In some embodiments, the selected wireless transmission power source 104 has knowledge of other WTPSs 104. The selected wireless transmission power source 104 may make the determination on whether to transmit the electromagnetic energization energy 108 based upon, among other things, whether the selected wireless transmission power source 104 has received acknowledgements 122 from other WTPSs 104. In other embodiments, the selected wireless transmission power source 104 may determine whether to begin transmission of the electromagnetic energization energy 108 based upon whether the selected wireless transmission power source has received a transmission granted message 142 from the transmission conflict controller 132.

In some embodiments, the WTPS 104 may be configured to monitor the current status of all or some of the other WTPSs 104, such as whether the monitored WTPSs 104 are, or are not currently emitting electromagnetic energization energy 108. In that embodiment, the selected WTPS 104 may determine whether or not to transmit the electromagnetic energization energy 108 based upon the current status of one or more of the monitored WTPSs 104. Also, in that embodiment, blocks 504 and 506 are optional.

If the selected wireless transmission power source 104 determines not to begin transmission of the electromagnetic energization energy 108, the process reverts to block 506. On the other hand, if the selected wireless transmission power source 104 determines to begin transmission of the electromagnetic energization energy 108, the process continues at block 510.

In some embodiments, blocks 504, 506 and 508 are optional. For example, in some embodiments, the selected wireless transmission power source 104 may begin transmission of electromagnetic energization energy 108 upon receiving the actuation command/signal. The selected wireless transmission power source may be configured to detect whether the electromagnetic energization energy 108 transmitted therefrom conflicts with electromagnetic energization energy 108 being transmitted from other WTPSs 104. If there is a conflict, the selected wireless transmission power source 104 may cease, or suspend, transmission of the electromagnetic energization energy 108 and may resume transmission of the electromagnetic energization energy 108 after a period of time.

At block 510, the selected wireless transmission power source 104 transmits the electromagnetic energization energy 108, and the electromagnetic energization energy 108 energizes the WDC devices 114. At block 512, which may be optional, the selected WTPS 104 listens to the interrogation of the WDC devices 114.

At block 514, the selected wireless transmission power source 104 determines whether to end the energization of the WDC devices 114. In some embodiments, the selected wireless transmission power source 104 may be configured to detect signals 116. In that case, the selected wireless transmission power source 104 may end transmission of the electromagnetic energization energy 108 after failing to detect the signals 117. In some embodiments, the selected wireless transmission power source 104 may determine to end the transmission of the electromagnetic energization energy 108 after a predetermined amount of time has passed since failing to detect the signals 117. In another embodiment, the wireless transmission power source 104 may be configured to end the transmission of the electromagnetic energization energy 108 in response to input by a user. The user may provide an end-prompt to the selected wireless transmission power source 104 using the ADC device 102. The end-prompt may be embodied in a message or may be embodied in a signal. In other embodiments, the user may provide an end-prompt to the selected wireless transmission power source 104 by physical manipulation of an actuator 130. In yet another embodiment, the selected wireless transmission power source 104 may determine to end the energization of the WDC devices 114 after a predetermined amount of time. The selected wireless transmission power source 104 may be configured to include or implement a timer, and when the selected wireless transmission power source 104 begins transmission of the electromagnetic energization energy 108, the timer is initiated.

If at block 514, the selected wireless transmission power source 104 determines not to end the transmission of the electromagnetic energization energy 108, then the process reverts to block 510. On the other hand, if the selected wireless transmission power source 104 determines to end the transmission of the electromagnetic energization energy 108, the process continues at block 516.

At block 516, the selected wireless transmission power source 104 ends the transmission of the electromagnetic energization energy 108.

At block 518, the selected wireless transmission power source 104 commences end-of-sequence procedures. In some embodiments, the end-of-sequence procedures may include providing acknowledgments 122 to other WTPSs 104. In some embodiments, the end-of-sequence procedures may include providing other WTPSs 104 and/or the TCC 132 with an end-of-transmission message 143.

At block 520, the selected wireless transmission power source 104 enters sleep mode awaiting another actuation command/signal.

For the sake of clarity in this disclosure, block 502 may be considered the beginning of an energization sequence, and any one of blocks 516, 518, and 520 may be considered the end of the energization sequence. In addition, in some embodiments, block 518 may be optional. Typically, an energization sequence begins when the selected wireless transmission power source 104 receives an actuation signal/command and ends when the selected wireless transmission power source 104 quits transmitting the electromagnetic energization energy 108 or ends sometime after the selected wireless transmission power source 104 quits transmitting the electromagnetic energization energy 108 such as after the selected wireless transmission power source 104 has completed administrative procedures, e.g., providing an end-of-transmission message 143, responding to quiet-prompts 120 by providing an acknowledgment 122, etc.

In some embodiments, if the selected wireless transmission power source 104 has commenced an energization sequence and then receives a quiet-prompt 120, the selected wireless transmission power source 104 may wait until the energization sequence has ended, or at least until block 514, before providing the acknowledgement 122 of the quiet-prompt 120. In such a situation, the other wireless transmission power source 104 that sent the quiet-prompt 120 may wait to begin transmission of electromagnetic energization energy 108 until the other WTPS 104 receives the acknowledgement 122, thereby preventing a conflict between the respective electromagnetic energization energies 108.

Figure 6:
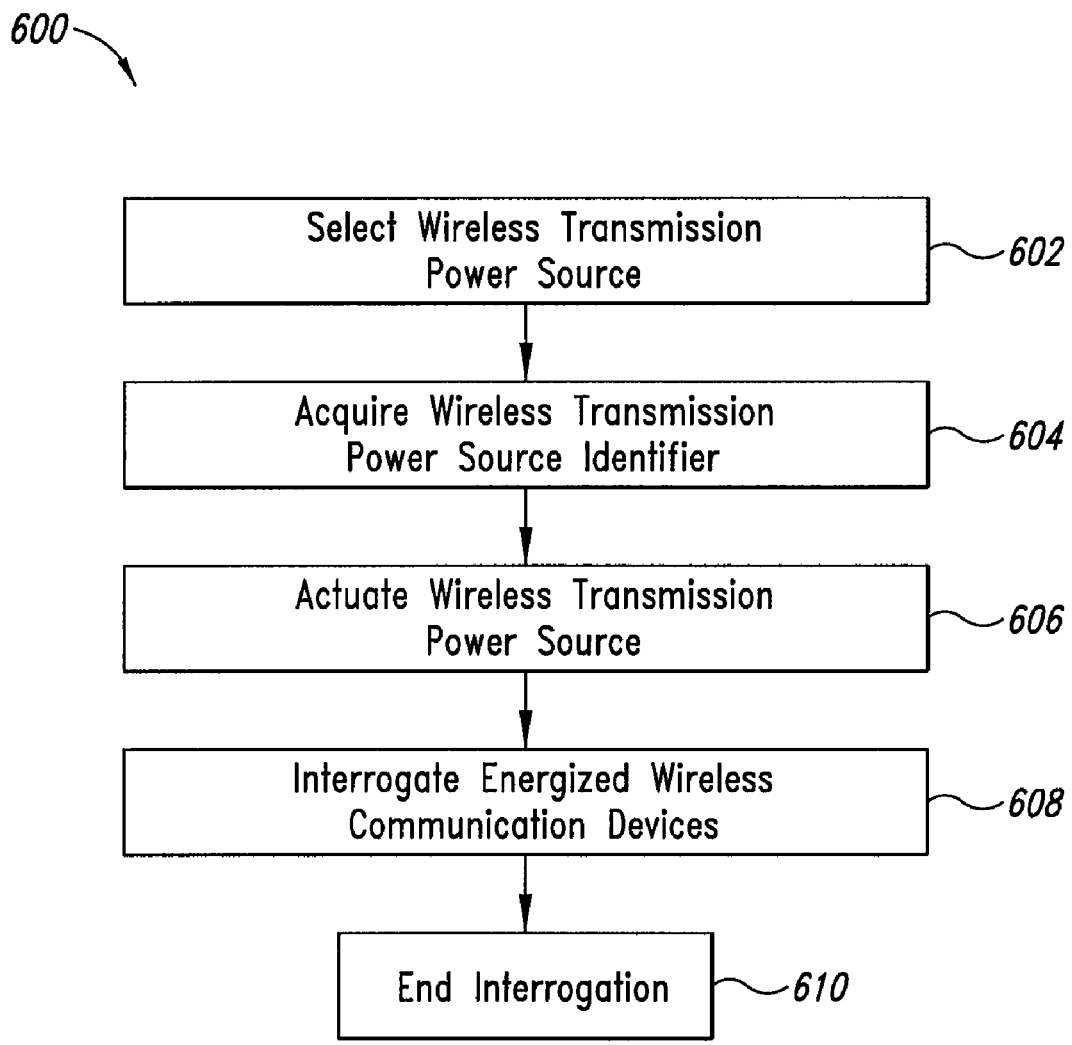
FIG. 6 is a flow diagram of an exemplary method implemented for interrogating wireless data communication devices, according to one non-limiting illustrated embodiment.

FIG. 6 shows a flow diagram of an exemplary method 600 implemented for interrogating WDC devices 114. At block 602, a user of an ADC device 102 selects a wireless transmission power source 104. At block 604, the user acquires the power-source identifier 126 from the selected wireless transmission power source 104. In some embodiments, the user may acquire the power-source identifier 126 by using a reader, for instance an optical scanner or imager such as a bar code reader to read the power-source identifier 126 on the selected wireless transmission power source 104. In other embodiments, the user may acquire the power-source identifier 126 from the selected wireless transmission power source 104 by interrogating the selected wireless transmission power source 104 with, for example, an RFID reader. In some embodiments, the power-source identifier 126 may be humanly readable, and in that case, the user may acquire the power-source identifier 126 by simply reading identifying information from the wireless transmission power source 124 of the selected wireless transmission power source 104, and manually entering the read identifying information for the wireless transmission power source 126 into the user's ADC device 102.

At block 606, the selected wireless transmission power source is actuated. It should be remembered that in some embodiments, the selected wireless transmission power source 104 may be actuated by a signal. In that case, block 604 may be optional. For example, the user's ADC device 102 may provide an actuation signal by illuminating a detector or the sensor 128 on the selected wireless transmission power source 104. Similarly, the selected wireless transmission power source 104 may be configured to be actuated by a radio frequency signal such as electromagnetic energization energy 108. In that case, the user may actuate the selected wireless transmission power source 104 by having the ADC device 102 emit electromagnetic energization energy 108 toward the selected wireless transmission power source 104. In yet another embodiment, the selected WTPS 104 may be actuated by the ADC 102 interrogating the selected WTPS 104. For example, in some embodiments, the WTPS 104 may include an RFID device or transponder, and the ADC device 102 may include an RFID reader, and the WTPS 104 may be actuated by RFID reader of the ADC device 102 interrogating the RFID device of the WTPS 104. Alternatively, in other embodiments, the wireless transmission power source 104 may be configured to be actuated via communications carried in message 119. In such embodiments, the wireless transmission power source 104 and the ADC device 102 may communicate via wireless technology such as BLUETOOTH® wireless protocol or WI-FI® wireless protocol, and in that case, the message 119 may include the actuation-prompt 118. In yet other embodiments, the wireless transmission power source 104 may be configured to include an actuator 130, and the user may actuate the selected wireless transmission power source 104 by physically manipulating the actuator 130.

At block 608, the ADC device 102 interrogates the energized WDC devices 114. During the interrogation of the WDC devices 114, the ADC device 102 receives data 116 carried in signals 117. In block 610, the interrogation of the WDC devices 114 is ended. In some embodiments, the ADC device 102 may provide an end-of-interrogation prompt to the wireless transmission power source 104. Based upon the end-of-interrogation prompt from the ADC device 102, the wireless transmission power source 104 may determine to end the energization of the WDC devices 114.

Figure 7:
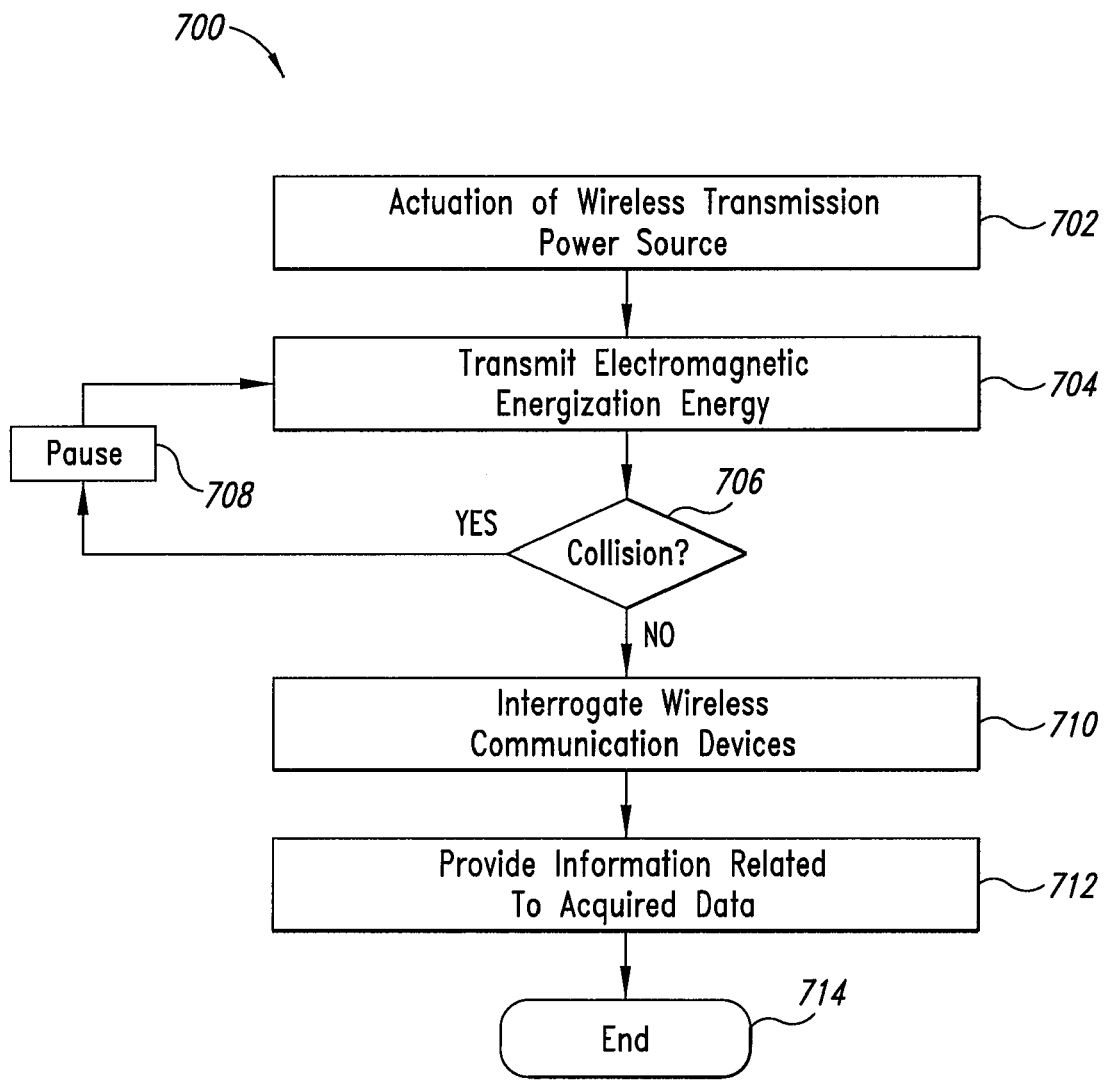
FIG. 7 is a flow diagram of an exemplary process implemented by the wireless transmission power source, according to one non-limiting illustrated embodiment.

FIG. 7 shows a flow diagram of an exemplary process 700 implemented by the wireless transmission power source 104. At block 702, a selected wireless transmission power source 104 is actuated. The selected wireless transmission power source 104 may be actuated by a prompt such as a message and/or by a signal, and/or by a user manually actuating the selected wireless transmission power source 104.

At block 704, the selected wireless transmission power source 104 transmits electromagnetic energization energy 108, thereby energizing the WDC devices 114.

At block 706, the wireless transmission power source 104 determines whether or not the transmitted electromagnetic energization energy 108 is colliding/conflicting with electromagnetic energization energy 108 from another wireless transmission power source 104. If the selected wireless transmission power source 104 determines that there are collisions, then the process proceeds to block 708. At block 708, the wireless transmission power source 104 pauses the transmission of electromagnetic energization energy 108. The wireless transmission power source 104 may pause the transmission for a random period of time. After pausing for a period of time, the process returns to block 704, where the wireless transmission power source 104 transmits, once again, electromagnetic energization energy 108.

If the wireless transmission power source 104 did not detect a collision/conflict, then the process continues at block 710. At block 710, the wireless transmission power source 104 interrogates the WDC devices 114. During the interrogation of the WDC devices 114, the wireless transmission power source 104 receives data 116 in signals 117. After interrogating the WDC devices 114, the process continues at block 712.

At block 712, the wireless transmission power source 104 provides information related to data 116 acquired during the interrogation of the WDC devices 114. In some embodiments, the wireless transmission power source 104 may provide the information related to acquired data 116 to the computing system 145 or to a central controller such as the transmission conflict controller 132. Alternatively, the wireless transmission power source 104 may provide the acquired information to the user's ADC device 102. The process 700 ends at block 714.

Figure 8A:
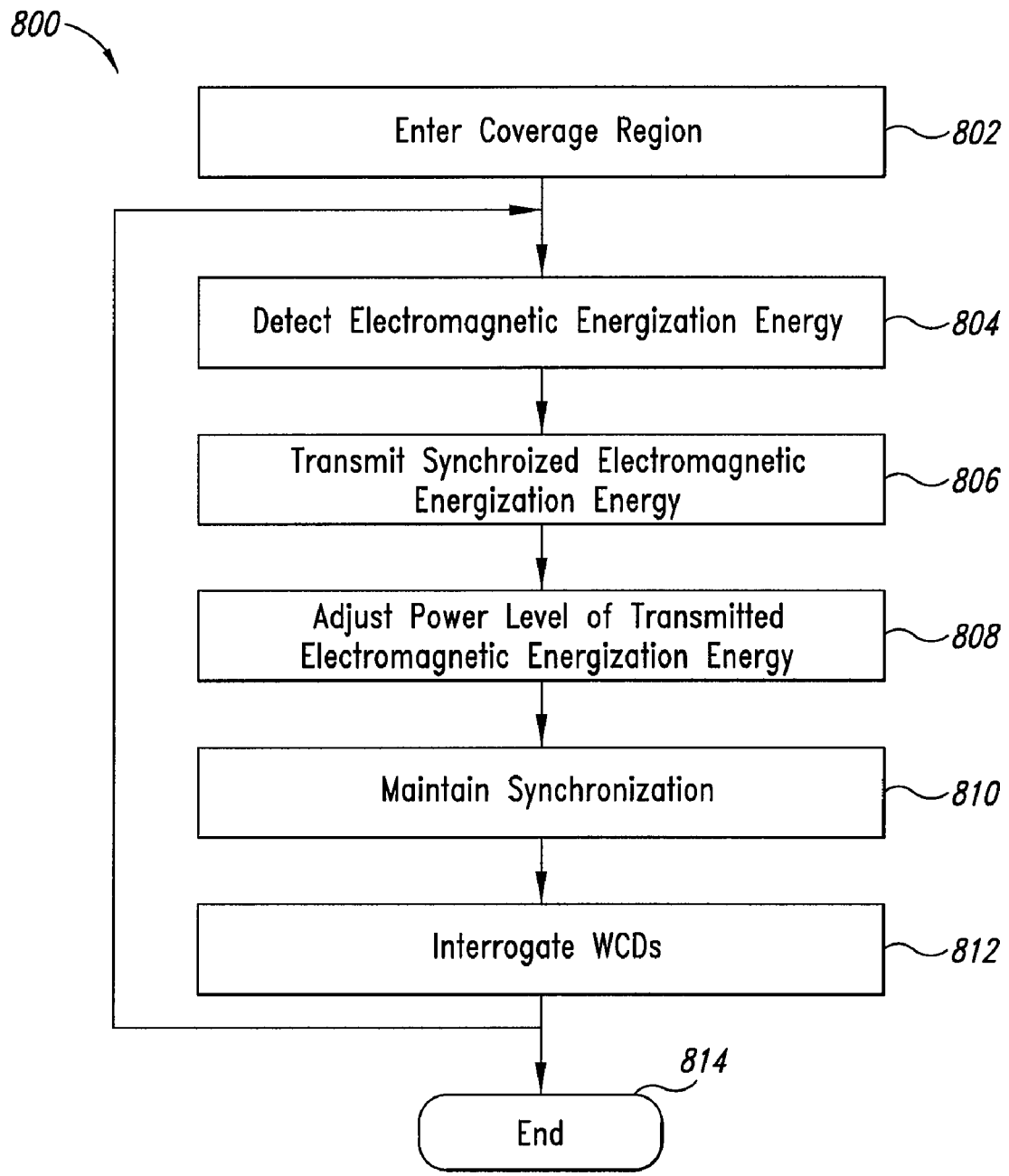
FIG. 8A is a process implemented by a user of the ADC device, according to one non-limiting illustrated embodiment.
Figure 8B:
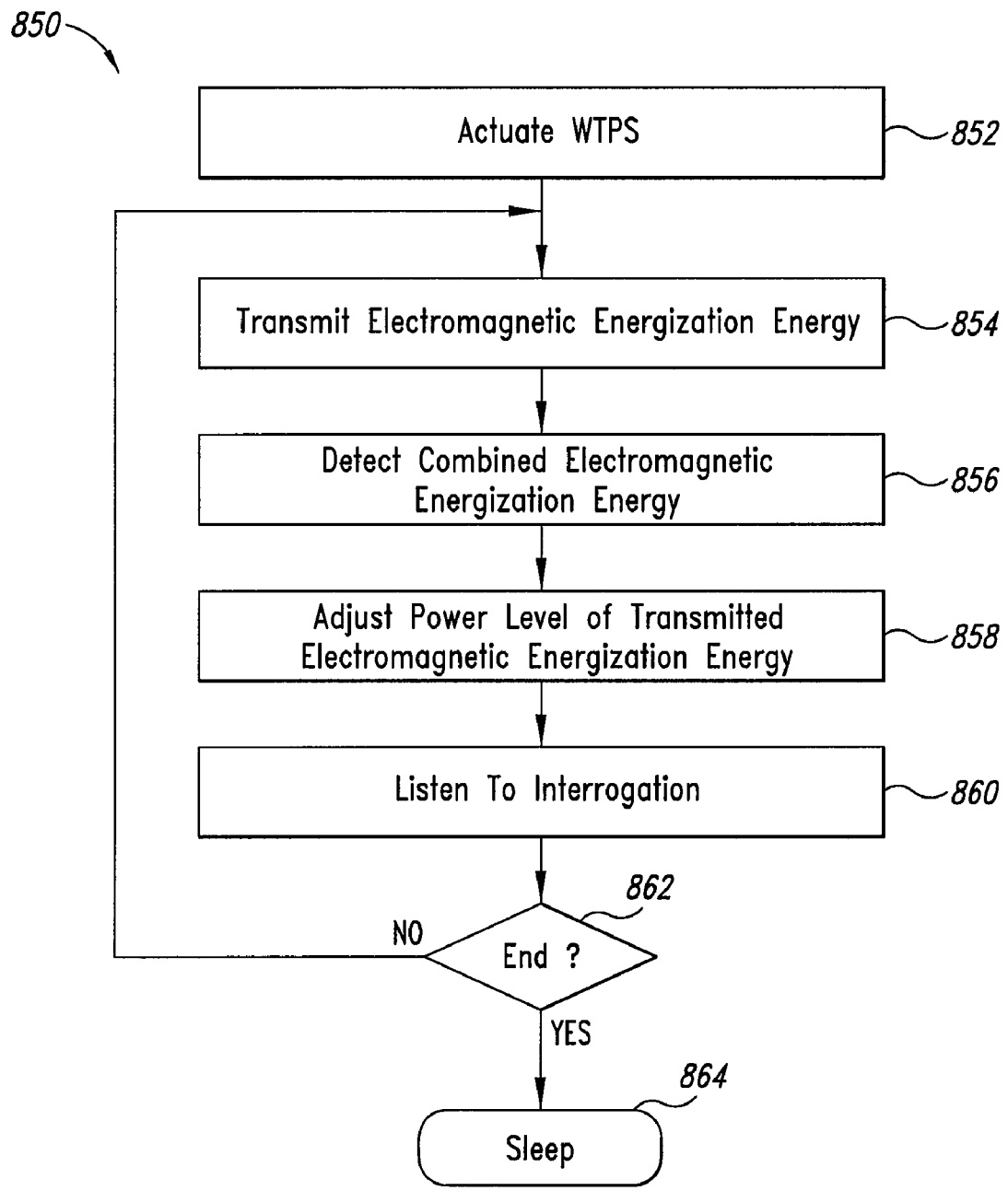
FIG. 8B is a process implemented at a wireless transmission power source that is complementary to the process of FIG. 8A, according to one non-limiting illustrated embodiment.

FIG. 8A shows an exemplary process 800 implemented by a user of the ADC device 102, and FIG. 8B shows a complementary exemplary process 850 implemented at a WTPS 104. At block 802, a user enters a coverage volume of space 110 of a particular WTPS 104 and actuates the ADC device 102.

At block 804, the ADC device 102 detects electromagnetic energization energy 108 from the WTPS 104.

At block 806, the ADC device 102 transmits electromagnetic energization energy 108 that is synchronized with the electromagnetic energization energy 108 from the WTPS 104.

At block 808, the ADC device 102 adjusts the power level of the electromagnetic energization energy 108 emitted from the ADC device 102 such that the intensity of the electromagnetic energization energy 108 from both the ADC device 102 and the selected WTPS 104 is sufficient to energize the WDC devices 114.

At block 810, the ADC device 102 maintains synchronization of the electromagnetic energization energy 108 transmitted from the ADC device 102 with the electromagnetic energization energy 108 transmitted from the selected WTPS 104. Typically, the synchronization needs to be maintained because the user does not hold the ADC device 102 absolutely stationary during process 800. Typically, the user will voluntarily or involuntarily cause the position of the ADC device 102 to drift.

At block 812, the ADC device 102 interrogates the WDC devices 114. Blocks 804-810 are repeated during the interrogation of the WDC devices 114. After the ADC device 102 has completed the interrogation of the WDC devices 114, the process 800 ends at block 814.

Referring to FIG. 8B, at block 852, the WTPS 104 is actuated. In one embodiment, the WTPS 104 may include a motion detector that causes the WTPS 104 to be actuated by the user entering the coverage volume of space 110 and/or entering a predetermined volume of space.

At block 854, the WTPS 104 transmits electromagnetic energization energy 108.

At block 856, the WTPS 104 detects the combined electromagnetic energization energy 108 from the ADC device 102 and the WTPS 104. At block 856, the WTPS 104 adjusts the power level of the electromagnetic energization energy 108 transmitted from the WTPS 104.

At block 860, the WTPS listens to the interrogation of the WDC devices 114.

At block 862, the WTPS 104 determines whether to end the transmission of the electromagnetic energization energy 108. The WTPS 104 may base the determination of whether to end the transmission of electromagnetic energization energy 108 upon having listened to the interrogation of the WDC devices 104. If the WTPS 104 determines not to end the transmission of the electromagnetic energization energy 108, the process 850 reverts to block 854. Otherwise, the process 850 continues at block 864 where the WTPS enters sleep mode.

In some embodiments, blocks 856 and 858 may be optional. In such embodiments, the WTPS 104 may transmit the electromagnetic energization energy 108 at a constant, or fairly constant power level, which is insufficient for energizing the WDC devices 114. In such embodiments, block 852 may also be optional. The WTPS 104 may transmit electromagnetic energization energy 108 regardless of whether, or not, a user of the ADC device 102 is attempting to interrogate the WDC devices 114.

In yet another embodiment, the WTPS 104 may initially transmit electromagnetic energization energy 108 at an initial power level upon actuation, and then increase the power level of the transmitted electromagnetic energization energy 108 during the interrogation of the WDC devices 114. The WTPS 104 may ramp up the power level of the transmitted electromagnetic energization energy 108 as time goes on during the interrogation of the WDC devices 114. Alternatively, the WTPS may increase the power level of the transmitted electromagnetic energization energy 108 based upon the detected intensity of the combined electromagnetic energization energy 108.

An advantage of increasing the power level of the transmitted electromagnetic energization energy 108 is that the WTPS may take more of the energization load from the ADC device 102, thereby conserving the energy in the power subsystem 178 of the ADC device 102.

Another advantage is that the WTPS 104 may begin to provide the electromagnetic energization energy 108 without an actuation command/signal from the ADC device 102. Merely entering the coverage volume of space 110 may actuate the WTPS 104. To conserve energy, the WTPS 104 begins transmitting the electromagnetic energization energy 108 at a low power level until the WTPS 104 detects, at block 856, electromagnetic energization energy 108 from the ADC device 102. If the WTPS 104 detects electromagnetic energization energy 108 from the ADC device 102, the WTPS 104 may increase the power level of the electromagnetic energization energy 108 transmitted therefrom. On the other hand, if the WTPS 104 does not detect electromagnetic energization energy 108 from the ADC device 102, the WTPS 104 quits transmitting electromagnetic energization energy 108. Thus, when a user of the ADC device 102 enters the covered region but does not interrogate the WDC devices 114, the WTPS 104 promptly ends the transmission of the electromagnetic energization energy 108.

In yet another embodiment, the WTPS 104 does not transmit electromagnetic energization energy 108 until the WTPS 104 detects, at block 856, electromagnetic energization energy 108 from the ADC device 102. In this embodiment, the WTPS 104 conserves energy by not transmitting the electromagnetic energization energy 108 until the WTPS 104 has determined that the ADC device 102 is actually attempting to interrogate the WDC devices 114. In this embodiment, the ADC device 102 begins the transmission of the electromagnetic energization energy 108 prior to the WTPS 104 transmitting a portion of the electromagnetic energization energy 108. Thus, after the WTPS 104 begins transmitting electromagnetic energization energy 108, the ADC device 102 detects electromagnetic energization energy 108 from the WTPS 104, at block 804, and then synchronizes with the WTPS 104 at block 806.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other automatic data collection systems, not necessarily the exemplary wireless data communication device based system embodiments generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of wirelessly providing power to remote wireless data communication devices, comprising:
   receiving, at a first wireless transmission power source of a plurality of wireless transmission power sources, an actuation-prompt;
   determining whether to wirelessly transmit electromagnetic energization energy from the first wireless transmission power source in response to receiving the actuation-prompt; and
   wirelessly transmitting electromagnetic energization energy from the first wireless transmission power source of the plurality of wireless transmission power sources for energizing at least one wireless data communication device during a first energization cycle of the first wireless transmission power source.

2. The method of claim 1, wherein determining whether to wirelessly transmit electromagnetic energization energy from the first wireless transmission power source in response to receiving the actuation-prompt includes:
   at the first wireless energy transmitter, requesting permission to wirelessly transmit electromagnetic energization energy; and
   at the first wireless energy transmitter, receiving permission to wirelessly transmit electromagnetic energization energy.

3. The method of claim 2, wherein requesting permission to wirelessly transmit electromagnetic energization energy includes, providing a quiet-prompt to at least a second wireless transmission power source of the plurality of wireless transmission power sources; and wherein receiving permission to wirelessly transmit electromagnetic energization energy includes, receiving from the at least second wireless transmission power source an acknowledgment; and further comprising
   selectively setting the second wireless transmission power source temporally into a quiet-mode during the first energization cycle of the first wireless transmission power source in response to receiving the quiet-prompt, wherein the second wireless transmission power source does not transmit electromagnetic energization energy for energizing wireless data communication devices when the second wireless transmission power source is in quiet-mode.

4. The method of claim 3 wherein selectively setting the second wireless transmission power source of the plurality of wireless transmission power sources temporally into a quiet-mode during the first energization cycle of the first wireless transmission power source includes:
   ignoring the quiet-prompt from the first wireless transmission power source during a first energization cycle of the second wireless transmission power source if the second wireless transmission power source began the first energization cycle of the second wireless transmission power source prior to receiving the quiet-prompt from the first wireless transmission power source;
   beginning transmission of electromagnetic energization energy from the second wireless transmission power source during the first energization cycle of the second wireless transmission power source;
   ending the transmission of electromagnetic energization energy from the second wireless transmission power source; and
   switching the second wireless transmission power source to the quiet-mode after the second wireless transmission power source ends the transmission of electromagnetic energization energy.

5. The method of claim 3 further including:
   receiving, at the first wireless transmission power source, a quiet-prompt from the second wireless transmission power source during the first energization cycle of the first wireless transmission power source;
   setting the first wireless transmission power source into the quiet-mode, wherein the first wireless transmission power source is not permitted to transmit electromagnetic energization energy while in the quiet-mode;
   receiving from the second wireless transmission power source an indication that the second wireless transmission power source is not currently transmitting electromagnetic energization energy; and
   in response to receiving from the second wireless transmission power source the indication that the second wireless transmission is not currently transmitting electromagnetic energization energy, setting the first wireless transmission power source into active-mode, wherein the first wireless transmission power source is permitted to transmit electromagnetic energization energy while in active-mode.

6. The method of claim 2, wherein requesting permission to wirelessly transmit electromagnetic energization energy includes:
   transmitting a message to a transmission conflict controller that is in communication with at least one other wireless transmission power source of the plurality of wireless transmission power sources; and
   wherein receiving permission to wirelessly transmit electromagnetic energization energy includes:
   receiving from the transmission conflict controller a message granting permission to transmit the electromagnetic energization energy.

7. The method of claim 1 wherein determining whether to wirelessly transmit electromagnetic energization energy from the first wireless transmission power source in response to receiving the actuation-prompt includes:
   at the first wireless transmission power source, initiating transmission of electromagnetic energization energy;
   at the first wireless transmission power source, detecting a collision between electromagnetic energization energy transmitted from the first wireless transmission power source and electromagnetic energization energy transmitted from a second wireless transmission power source of the plurality of wireless transmission power sources;
   at the first wireless transmission power source, pausing the transmission of electromagnetic energization energy; and
   at the first wireless transmission power source, re-initiating transmission of electromagnetic energization energy.

8. The method of claim 1, further comprising:
   ending the wireless transmission of electromagnetic energization energy from the first wireless transmission power source; and
   providing, from the first wireless transmission power source, an indication that the first wireless transmission power source has ended the transmission of electromagnetic energization energy.

9. The method of claim 8 wherein providing, from the first wireless transmission power source, an indication that the first wireless transmission power source has ended the transmission of electromagnetic energization energy includes at least one of:
   providing the indication to at least a second wireless transmission power source of the plurality of wireless transmission power sources; or
   providing the indication to central transmission conflict controller.

10. The method of claim 1 wherein the actuation-prompt is at least one of a message conforming to a communication protocol, a user-input provided by a user physically manipulating the first wireless transmission power source, or a signal.

11. The method of claim 1, further comprising:
   at the first wireless transmission power source, interrogating at least one wireless data communication device energized by the electromagnetic energization energy wirelessly transmitted from the first wireless transmission power source;
   at the first wireless transmission power source, receiving data from at least one wireless data communication device energized by the electromagnetic energization energy wirelessly transmitted from the first wireless transmission power source; and
   providing, from the first wireless transmission source, information related to the data received from the energized at least one wireless data communication device.

12. The method of claim 11 wherein providing, from the first wireless transmission source, information related to the data received from the energized at least one wireless data communication device includes at least one of:
   providing the information related to the data to portable hand-held device of the user; or
   providing the information to a remote computing system.

13. A portable hand-held automatic data collection device comprising:
   a housing shaped and sized for being portable and hand-held by a user;
   an actuation subsystem, disposed within the housing, configured to wirelessly provide an actuation-prompt to a remote first wireless transmission power source of a plurality of remote wireless transmission power sources to cause the first wireless transmission power source to wirelessly transmit the electromagnetic energization energy for energizing remote wireless data communication devices; and a data collection subsystem, disposed within the housing, configured to wirelessly interrogate one or more remote wireless data communication devices energized by the remote first wireless transmission power source.

14. The portable hand-held automatic data collection device of claim 13 wherein the actuation subsystem further comprises:

a wireless communication subsystem configured to transmit a message to the remote first wireless transmission power source, the message including the actuation-prompt.

15. The portable hand-held automatic data collection device of claim 14 wherein the wireless communication subsystem communicates with the first wireless transmission power source using at least one of communication protocol in accordance with a wireless communication protocol.

16. The portable hand-held automatic data collection device of claim 15 wherein the data collection subsystem interrogates energized remote wireless data communication devices in accordance with a radio frequency identification device protocol.

17. The portable hand-held automatic data collection device of claim 14 wherein each one of the wireless transmission power sources has a respective power-source identifier associated therewith, wherein the message includes an indicator of the power-source identifier associated with the first wireless transmission power source, and wherein the power-source identifier uniquely identifies the first wireless transmission power source within the plurality of wireless transmission power sources.

18. The portable hand-held automatic data collection device of claim 13, wherein the data collection subsystem is configured to wirelessly acquire from the first wireless transmission power source the power-source identifier of the first wireless transmission power source.

19. The portable hand-held automatic data collection device of claim 18 wherein the remote-data collection subsystem further comprises at least one of a radio frequency identification device subsystem or an optical scanner.

20. The portable hand-held automatic data collection device of claim 17, further comprising:

a user interface subsystem configured to enable a user to provide user-input, wherein user-input provided by the user includes a first indicator of the power-source identifier associated with the first wireless transmission power source, and wherein the message includes a second indicator of the power-source identifier associated with the first wireless transmission power source.

21. The portable hand-held automatic data collection device of claim 13, further comprising:

a user interface subsystem configured to enable a user to provide user-input, wherein user-input includes input for selecting an operational data collection mode of the hand-held automatic collection device; and a controllable energy emitter subsystem, disposed at least partially within the housing, and configured to wirelessly emit the electromagnetic energization energy at a controllable power level.

22. The portable hand-held automatic data collection device of claim 21, further comprising:

a controller subsystem, disposed within the housing and in communication with the user input subsystem and the energy emitter subsystem, configured to receive user-input for selecting an operational data collection mode from the user interface subsystem and configured to switch the portable hand-held automatic data collection device into a specific operational data collection mode in response to the user-input, the specific operational data collection mode being one of stand-alone mode, assisted energization mode, interrogation mode, and actuation mode, and configured to control the power level at which the controllable energy emitter subsystem transmits electromagnetic energization energy based at least upon the specific operational data collection mode.

23. The portable hand-held automatic data collection device of claim 13 wherein the actuation subsystem includes a radio frequency identification reader that provides the actuation-prompt to the first wireless transmission power source.

24. The portable hand-held automatic data collection device of claim 23 wherein the actuation-prompt is at least one of electromagnetic energization energy emitted from the portable hand-held data collection device or at least a portion of a communication that is in accordance with a radio frequency identification communication protocol.

25. The portable hand-held automatic data collection device of claim 13 wherein the actuation subsystem includes a light source that provides the actuation-prompt to the first wireless transmission power source.

26. The portable hand-held automatic data collection device of claim 25, further comprising:

an optical reader configured to read machine-readable symbols, wherein the optical reader includes the light source that provides the actuation-prompt.

27. The portable hand-held automatic data collection device of claim 13, further comprising:

a user interface subsystem configured to enable a user to provide user-input, wherein user-input includes input for selecting an actuation-prompt mode of the hand-held automatic collection device;

an optical reader, disposed at least partially within the housing, configured to read machine-readable symbols, the optical reader having a light source;

a radio frequency identification reader, disposed at least partially within the housing, configured to wirelessly interrogate;

a wireless communication subsystem configured to wirelessly communicate with the first wireless transmission power source in accordance to a wireless communication protocol; and a controller subsystem, disposed within the housing and in communication with the user input subsystem, the optical scanner, and the radio frequency identification reader, configured to receive user-input for selecting actuation mode from the user interface subsystem and configured to switch the portable hand-held automatic data collection device into a specific actuation-prompt mode in response to the user-input, the specific actuation mode being one of message-mode and signal-mode, and configured to select one of the light emitting source, the radio frequency identification reader, the wireless communication subsystem to provide the actuation-prompt based at least in part on the specific actuation-prompt mode.

28. The portable hand-held automatic data collection device of claim 27 wherein actuation-prompt is a signal provided by the radio frequency identification reader, the actuation-prompt being one of electromagnetic energization energy or at least a portion of a communication in accordance with a radio frequency identification communication protocol, wherein if the actuation-prompt is at least a portion of the communication, the first wireless transmission power source is actuated by receipt of the communication and not by information carried in the communication.

29. The portable hand-held automatic data collection device of claim 27 wherein actuation-prompt is a signal provided by the light source.

30. The portable hand-held automatic data collection device of claim 27 wherein actuation-prompt is a message provided by one of the wireless communication subsystem or the radio frequency identification reader.

31. A wireless transmission power source comprising:
an actuation subsystem configured to receive an actuation-prompt to cause the wireless transmission power source to wirelessly transmit electromagnetic energization energy for energizing remote wireless data communication devices;
a wireless energy transmitter subsystem configured to wirelessly transmit electromagnetic energization energy directed at a coverage volume of space; and
a conflict control subsystem configured to selectively permit the wireless energy transmitter subsystem to wirelessly transmit electromagnetic energization energy.

32. The wireless transmission power source of claim 31 wherein the actuation subsystem includes a wireless communication subsystem configured to wirelessly receive a message, from a remote automatic collection device, the message carrying an indicator of a power-source identifier that is associated with the wireless transmission power source, whereupon receiving the signal the wireless transmission power source begins an energization sequence, wherein during the energization sequence, the wireless transmission power source transmits electromagnetic energization energy at the coverage volume of space.

33. The wireless transmission power source of claim 32, further comprising:
an active wireless data communication device having a memory with the power-source identifier stored therein.

34. The wireless transmission power source of claim 32, further comprising:
a housing that carries the power-source identifier, and wherein the power-source identifier is embodied in at least one of machine-readable indicia or human-readable.

35. The wireless transmission power source of claim 31 wherein the actuation subsystem includes a sensor subsystem configured to receive a signal, from a remote automatic collection device, whereupon receiving the signal the wireless transmission power source begins an energization sequence, wherein during the energization sequence, the wireless transmission power source transmits electromagnetic energization energy at the coverage volume of space.

36. The wireless transmission power source of claim 31 wherein the actuation subsystem includes a motion detector configured to detect motion in a predetermined volume of space, whereupon detecting motion in the predetermined volume of space the wireless transmission power source begins an energization sequence, wherein during the energization sequence, the wireless transmission power source transmits electromagnetic energization energy at the coverage volume of space.

37. The wireless transmission power source of claim 31 wherein the actuation subsystem includes an actuator subsystem configured to be physically manipulated by a user, whereupon physical manipulation of actuator subsystem the wireless transmission power source begins an energization sequence, wherein during the energization sequence, the wireless transmission power source transmits electromagnetic energization energy at the coverage volume of space.

38. The wireless transmission power source of claim 31, further including:
a data collection subsystem configured to wirelessly interrogate wireless data communication devices, wherein the data collection subsystem receives, from a remote automatic collection device, the actuation-prompt and configured to provide the actuation subsystem of an indicator of the received actuation-prompt, whereupon receiving the actuation-prompt the wireless transmission power source begins an energization sequence, wherein during the energization sequence, the wireless transmission power source transmits electromagnetic energization energy at the coverage volume of space.

39. The wireless transmission power source of claim 38, wherein the wireless energy transmitter subsystem is further configured to detect electromagnetic energization energy from a remote automatic collection device, and configured to provide the actuation subsystem an indicator of the detected electromagnetic energization energy, whereupon receiving the indicator of the detected electromagnetic energization energy the wireless transmission power source begins an energization sequence, wherein during the energization sequence, the wireless transmission power source transmits electromagnetic energization energy into the coverage volume of space.

40. The wireless transmission power source of claim 31, wherein the conflict control subsystem is further configured to request permission for the wireless transmission power source to transmit electromagnetic energization energy, and configured to receive permission to transmit electromagnetic energization energy.

41. The wireless transmission power source of claim 40, wherein the conflict control subsystem requests permission for the wireless transmission power source to transmit electromagnetic energization energy by at least one of providing a quiet-prompt to a second wireless transmission power source, or providing a transmission request to a transmission conflict controller, wherein the transmission conflict controller is in communication with at least one other wireless transmission power source.

42. The wireless transmission power source of claim 31, wherein the conflict control subsystem is further configured to determine whether to permit the wireless energy transmitter subsystem to wirelessly transmit electromagnetic energization energy based at least upon a status of a second wireless transmission power source.

43. The wireless transmission power source of claim 42, wherein the conflict control subsystem is further configured to monitor the status of the second wireless transmission power source using at least a message, wherein based at least upon the message, the conflict control subsystem determines whether the second wireless transmission power source is currently in an energization cycle.

44. The wireless transmission power source of claim 31, further comprising:
a radio receiver configured to detect electromagnetic energization energy transmitted from a second wireless transmission power source, and wherein the conflict control subsystem is further configured to determine whether to permit the wireless energy transmitter subsystem to wirelessly transmit electromagnetic energization energy based at least upon whether the radio receiver is currently detecting electromagnetic energization energy transmitted from the second wireless transmission power source.

45. A system for interrogating passive wireless data communication devices, comprising:
- a plurality of wireless transmission power sources, each one of the wireless transmission power sources having a respective housing and each one of the wireless transmission power sources coupled to a remote power source and configured to wirelessly transmit electromagnetic energization energy into respective coverage volumes of space for energizing passive wireless data communication devices therein, wherein the respective coverage volume of space of at least one of the wireless transmission power sources overlaps the respective coverage volume of space of at least another one of the wireless transmission power sources; and
- a hand-held portable automatic data collection device configured to interrogate energized wireless data communication devices.

46. The system of claim 45 wherein each one of the wireless transmission power sources includes an actuation subsystem for receiving an actuation-prompt, wherein when the actuation subsystem of a respective wireless transmission power source of the plurality of wireless transmission power sources receives the actuation-prompt, the respective wireless transmission power source selectively wirelessly transmits electromagnetic energization energy into the coverage volume of space of the respective wireless transmission power source.

47. The system of claim 46 wherein each one of the wireless transmission power sources includes means for wirelessly receiving the actuation-prompt.

48. The system of claim 47 wherein the actuation-prompt is a wirelessly transmitted signal.

49. The system of claim 48 wherein the wirelessly transmitted signal is at least one of a light wave or a radio wave.

50. The system of claim 47 wherein the actuation-prompt is a wirelessly transmitted message containing an indicator of a power-source identifier, the power-source identifier associated with the respective wireless transmission power source and uniquely identifying the respective wireless transmission power source within the plurality of wireless transmission power sources.

51. The system of claim 47 wherein the actuation-prompt is a wirelessly transmitted message containing an indicator of a power-source identifier, the power-source identifier associated with the respective wireless transmission power source and uniquely identifying the respective wireless transmission power source within the plurality of wireless transmission power sources.

52. The system of claim 47 wherein the means for wirelessly receiving the actuation-prompt is at least one of a wireless communication device configured to receive and transmit messages, a radio frequency detector, or a light detector.

53. The system of claim 45 wherein at least one of the wireless transmission power sources of the plurality of wireless transmission power sources includes:
- a first wireless communication means for interrogating wireless data communication devices; and
- a second wireless communication means for receiving messages from and sending messages to the automatic data collection device, wherein the first wireless communication means and the second wireless communication means are not the same.

54. The system of claim 45 wherein each wireless transmission power source of the plurality of wireless transmission power sources includes:
- a wireless communications subsystem configured to receive messages from and send messages to other wireless transmission power sources of the plurality of wireless transmission power sources;
- a wireless energy transmitter subsystem configured to wirelessly transmit electromagnetic energization energy into the respective coverage volume of space to energize passive wireless data communication devices therein; and
- a conflict control subsystem configured to selectively permit the wireless energy transmitter subsystem to transmit electromagnetic energization energy into the respective coverage volume of space based at least upon one or more messages from at least one other wireless transmission power source.

55. The system of claim 45 wherein each wireless transmission power source of the plurality of wireless transmission power sources has a respective power-source identifier associated therewith; wherein the automatic data collection device includes:
- a power-transmitter identifier subsystem configured to acquire from a selected power transmission power source of the plurality of the power transmission power source a first indicator of the power-source identifier associated with the selected power transmission power source; and
- a wireless communication subsystem configured to wirelessly communicate a second indicator of the power-source identifier associated with the selected power transmission power source in a message having the actuation-prompt to the selected power transmission power source.

56. A system for energizing passive wireless data communication devices, comprising:
- a plurality of wireless transmission power sources, each respective wireless transmission power source of the plurality of wireless transmission power sources includes:
- a power subsystem coupled to at least one remote power source and configured to provide electrical power to the respective wireless transmission power source;
- a wireless energy transmitter subsystem configured to wirelessly transmit electromagnetic energization energy into a coverage volume of space of the respective wireless transmission power source for energizing passive wireless data communication devices therein, wherein the respective coverage volume of space of at least one of the wireless transmission power sources overlaps the respective coverage volume of space of at least another one of the wireless transmission power sources;
- a communication subsystem configured to send messages to and receive messages from at least one other wireless transmission power sources; and
- a conflict control subsystem configured to configured to selectively permit the wireless energy transmitter subsystem to transmit electromagnetic energization energy into the respective coverage volume of space based at least upon one or more messages from at least one other wireless transmission power source.

57. The system of claim 56 wherein each respective wireless transmission power source of the plurality of wireless transmission power sources includes:
- an actuation subsystem configured to receive an actuation-prompt and initiate an energization sequence upon receiving the actuation-prompt, wherein the communication subsystem sends a first message to at least one other wireless transmission power source in response to the actuation subsystem receiving the actuation-prompt, wherein the communication subsystem receives a second message from the at least one other wireless transmission power source, and wherein the conflict control subsystem selectively permits the wireless energy transmission subsystem to transmit the electromagnetic energization energy based at least upon the second message from the at least one other wireless transmission power source.

58. The system of claim 57 wherein for each wireless transmission power source the respective actuation subsystem is configured to be physically manipulated by a user for providing the actuation-prompt.

59. The system of claim 57 wherein for each wireless transmission power source the respective actuation subsystem is configured to wirelessly receive the actuation-prompt.

60. The system of claim 56 wherein for each wireless transmission power source the respective conflict control subsystem is configured to determine a status of at least one other wireless transmission power source, the status being one of the at least one other wireless transmission power source is currently in a respective energization sequence or the least one other wireless transmission power source is currently not in a respective energization sequence, based upon at least one message from the least one other wireless transmission power source.

61. The system of claim 60 wherein each respective wireless transmission power source of the plurality of wireless transmission power sources includes:
an actuation subsystem configured to receive an actuation-prompt and initiate a current energization sequence for the respective wireless transmission power source upon receiving the actuation-prompt; and wherein the respective conflict control subsystem is configured to generate a first message indicative of the respective wireless transmission power source having completed energization sequence, and wherein the communication subsystem sends the first message to the at least one other wireless transmission power source after the respective conflict control subsystem has permitted the respective wireless energy transmission subsystem to transmit electromagnetic energization energy into the respective coverage volume of space.

62. A system for energizing passive wireless data communication devices, comprising:
a plurality of wireless transmission power sources, each respective wireless transmission power source of the plurality of wireless transmission power sources includes:
a power subsystem coupled to a remote power source and configured to provide electrical power to the respective wireless transmission power source;
a wireless energy transmitter subsystem configured to wirelessly transmit electromagnetic energization energy into a coverage volume of space of the respective wireless transmission power source for energizing passive wireless data communication devices therein, wherein the respective coverage volume of space of at least one of the wireless transmission power sources overlaps the respective coverage volume of space of at least another one of the wireless transmission power sources;
a communication subsystem configured to send messages and receive messages; and
a conflict control subsystem configured to configured to selectively permit the wireless energy transmitter subsystem to transmit electromagnetic energization energy into the respective coverage volume of space based at least upon one or more messages; and the system further comprising:
a remote transmission conflict controller in communication with each wireless transmission power source and configured to determine for each wireless transmission power source whether the respective wireless transmission power source is permitted to transmit electromagnetic energization energy into the respective coverage volume.

63. The system of claim 62 wherein each respective wireless transmission power source of the plurality of wireless transmission power sources includes:
an actuation subsystem configured to receive an actuation-prompt and initiate an energization sequence upon receiving the actuation-prompt, wherein the communication subsystem sends a first message to the remote transmission conflict controller in response to the actuation subsystem receiving the actuation-prompt, wherein the communication subsystem receives a second message from the remote transmission conflict controller, and wherein the conflict control subsystem permits the wireless energy transmission subsystem to transmit the electromagnetic energization energy based at least upon the second message from the remote transmission conflict controller.

64. The system of claim 62 wherein each respective wireless transmission power source of the plurality of wireless transmission power sources includes:
an interrogation subsystem configured to interrogate the energized wireless data communication devices in the respective coverage volume of space, and wherein the communication subsystem provides information that is indicative of data acquired from the energized wireless data communication devices in the respective coverage volume of space.

65. The system of claim 64 further comprising:
a portable hand-held automatic data collection device configured to wirelessly communicate with the wireless transmission power sources, wherein the portable hand-held automatic data collection device receives the information that is indicative of data acquired from the energized wireless data communication devices in the respective coverage volume of space from the respective wireless transmission power source that interrogated the wireless data communication devices.

66. The system of claim 64 further comprising:
a computing system communicatively coupled to the plurality of wireless transmission power sources and configured to receive from the respective wireless transmission power source that interrogated the wireless data communication devices the information that is indicative of data acquired from the energized wireless data communication devices in the respective coverage volume of space.

* * * * *

UNITED STATES PATENT AND TRADEMARK OFFICE
CERTIFICATE OF CORRECTION

| | |
|---|---|
| PATENT NO. | : 7,868,586 B2 |
| APPLICATION NO. | : 11/932281 |
| DATED | : January 11, 2011 |
| INVENTOR(S) | : Mike Petterson et al. |

It is certified that error appears in the above-identified patent and that said Letters Patent is hereby corrected as shown below:

Title Page, Item 54:
"SYSTEM, DEVICES, AND METHOD FOR SELECTIVELY WIRELESSLY ENERGIZING PASSIVE WIRELESS DATA COMMUNICATIONS DEVICES" should read, --SYSTEM, DEVICES AND METHODS FOR SELECTIVELY WIRELESSLY ENERGIZING PASSIVE WIRELESS DATA COMMUNICATIONS DEVICES--.

Signed and Sealed this
Twenty-eighth Day of June, 2011

David J. Kappos
*Director of the United States Patent and Trademark Office*

UNITED STATES PATENT AND TRADEMARK OFFICE
CERTIFICATE OF CORRECTION

PATENT NO. : 7,868,586 B2  Page 1 of 1
APPLICATION NO. : 11/932281
DATED : January 11, 2011
INVENTOR(S) : Mike Petterson et al.

It is certified that error appears in the above-identified patent and that said Letters Patent is hereby corrected as shown below:

Title Page, Item 54 and at Column 1, lines 1-4, Title,
"SYSTEM, DEVICES, AND METHOD FOR SELECTIVELY WIRELESSLY ENERGIZING PASSIVE WIRELESS DATA COMMUNICATIONS DEVICES" should read, --SYSTEM, DEVICES AND METHODS FOR SELECTIVELY WIRELESSLY ENERGIZING PASSIVE WIRELESS DATA COMMUNICATIONS DEVICES--.

This certificate supersedes the Certificate of Correction issued June 28, 2011.

Signed and Sealed this
Twenty-sixth Day of July, 2011

David J. Kappos
*Director of the United States Patent and Trademark Office*